United States Patent
Shrivastava et al.

(10) Patent No.: US 10,914,118 B2
(45) Date of Patent: Feb. 9, 2021

(54) MULTI-ZONE EC WINDOWS

(71) Applicant: View, Inc., Milpitas, CA (US)

(72) Inventors: Dhairya Shrivastava, Los Altos, CA (US); Robin Friedman, Sunnyvale, CA (US); Vinod Khosla, Portola Valley, CA (US); Rao Mulpuri, Saratoga, CA (US); Anshu A. Pradhan, Collierville, TN (US)

(73) Assignee: VIEW, INC., Milpitas, CA (US)

( * ) Notice: Subject to any disclaimer, the term of this patent is extended or adjusted under 35 U.S.C. 154(b) by 0 days.

(21) Appl. No.: 15/039,370

(22) PCT Filed: Dec. 18, 2014

(86) PCT No.: PCT/US2014/071314
§ 371 (c)(1),
(2) Date: May 25, 2016

(87) PCT Pub. No.: WO2015/095615
PCT Pub. Date: Jun. 25, 2015

(65) Prior Publication Data
US 2017/0130523 A1 May 11, 2017

Related U.S. Application Data

(63) Continuation-in-part of application No. 15/094,897, filed on Apr. 8, 2016, now Pat. No. 10,310,871.
(Continued)

(51) Int. Cl.
*G02F 1/03* (2006.01)
*G02F 1/07* (2006.01)
(Continued)

(52) U.S. Cl.
CPC .............. *E06B 9/24* (2013.01); *B23K 26/359* (2015.10); *E06B 3/6715* (2013.01);
(Continued)

(58) Field of Classification Search
CPC .................................. G02F 1/163; G02F 1/15
(Continued)

(56) References Cited

U.S. PATENT DOCUMENTS 3,271,286 A 9/1966 Lepselter
3,521,941 A 7/1970 Deb et al.
(Continued)

FOREIGN PATENT DOCUMENTS

CN 1537257 A 10/2004
CN 1703653 A 11/2005
(Continued)

OTHER PUBLICATIONS

U.S. Appl. No. 15/094,897, filed Apr. 8, 2016, entitled Multi-zone EC Windows.
(Continued)

*Primary Examiner* — Mahidere S Sahle
(74) *Attorney, Agent, or Firm* — Weaver Austin Villeneuve & Sampson LLP; Brian D. Griedel

(57) ABSTRACT

Thin-film devices, for example, multi-zone electrochromic windows, and methods of manufacturing are described. In certain cases, a multi-zone electrochromic window comprises a monolithic EC device on a transparent substrate and two or more tinting zones, wherein the tinting zones are configured for independent operation.

22 Claims, 24 Drawing Sheets

Related U.S. Application Data which is a continuation of application No. 14/137,644, filed on Dec. 20, 2013, now Pat. No. 9,341,912, which is a continuation-in-part of application No. PCT/US2013/069913, filed on Nov. 13, 2013, said application No. 14/137,644 is a continuation-in-part of application No. PCT/US2013/031098, filed on Mar. 13, 2013.

(60) Provisional application No. 61/725,980, filed on Nov. 13, 2012, provisional application No. 61/740,651, filed on Dec. 21, 2012, provisional application No. 61/610,241, filed on Mar. 13, 2012.

(51) Int. Cl.
*E06B 9/24* (2006.01)
*G02F 1/153* (2006.01)
*E06B 3/67* (2006.01)
*B23K 26/359* (2014.01)
*G09F 23/02* (2006.01)

(52) U.S. Cl.
CPC ............ *E06B 3/6722* (2013.01); *G02F 1/153* (2013.01); *G02F 1/1533* (2013.01); *G09F 23/02* (2013.01); *E06B 2009/2405* (2013.01); *E06B 2009/2464* (2013.01); *Y10T 29/49002* (2015.01)

(58) Field of Classification Search
USPC .................................................. 359/265, 275
See application file for complete search history.

(56) References Cited

U.S. PATENT DOCUMENTS

| | | |
|---|---|---|
| 3,652,929 A | 3/1972 | Cushman |
| 4,129,861 A | 12/1978 | Giglia |
| 4,166,918 A | 9/1979 | Nostrand et al. |
| 4,293,194 A | 10/1981 | Takahashi |
| 4,309,082 A | 1/1982 | Kohara et al. |
| 4,537,826 A | 8/1985 | Miyamura et al. |
| 4,543,171 A | 9/1985 | Firester et al. |
| 4,570,046 A | 2/1986 | Melanson et al. |
| 4,806,496 A | 2/1989 | Suzuki et al. |
| 4,832,468 A | 5/1989 | Ito et al. |
| 4,923,289 A | 5/1990 | Demiryont |
| 4,937,423 A | 6/1990 | Yoshihara et al. |
| 5,011,582 A | 4/1991 | Oshikawa et al. |
| 5,017,755 A | 5/1991 | Yahagi et al. |
| 5,076,673 A | 12/1991 | Lynam et al. |
| 5,140,455 A | 8/1992 | Varaprasad et al. |
| 5,142,407 A | 8/1992 | Varaprasad et al. |
| 5,145,609 A | 9/1992 | Varaprasad et al. |
| 5,151,816 A | 9/1992 | Varaprasad et al. |
| 5,187,607 A | 2/1993 | Endo et al. |
| 5,202,788 A | 4/1993 | Weppner |
| 5,233,461 A | 8/1993 | Dornan et al. |
| 5,239,405 A | 8/1993 | Varaprasad et al. |
| 5,290,986 A | 3/1994 | Colon et al. |
| 5,340,503 A | 8/1994 | Varaprasad et al. |
| 5,379,146 A | 1/1995 | Defendini |
| 5,471,338 A | 11/1995 | Yu et al. |
| 5,472,643 A | 12/1995 | Varaprasad et al. |
| 5,500,760 A | 3/1996 | Varaprasad et al. |
| 5,567,360 A | 10/1996 | Varaprasad et al. |
| 5,657,149 A | 8/1997 | Buffat et al. |
| 5,657,150 A | 8/1997 | Kallman et al. |
| 5,668,663 A | 9/1997 | Varaprasad et al. |
| 5,724,175 A | 3/1998 | Hichwa et al. |
| 5,724,176 A | 3/1998 | Nishikitani et al. |
| 5,724,187 A | 3/1998 | Varaprasad et al. |
| 5,747,770 A | 5/1998 | Bogart |
| 5,777,603 A | 7/1998 | Jaeger |
| 5,805,330 A | 9/1998 | Byker et al. |
| 5,814,195 A | 9/1998 | Lehan et al. |
| 5,830,336 A | 11/1998 | Schulz |
| 5,837,960 A | 11/1998 | Lewis et al. |
| 5,907,383 A | 5/1999 | Kurihara et al. |
| 5,953,150 A | 9/1999 | Smarto et al. |
| 5,969,847 A | 10/1999 | Coleman et al. |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,039,850 A | 3/2000 | Schulz |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,074,279 A | 6/2000 | Yoshimura et al. |
| 6,094,292 A | 7/2000 | Goldner et al. |
| 6,118,573 A | 9/2000 | Kubo et al. |
| 6,143,209 A | 11/2000 | Lynam |
| 6,154,306 A | 11/2000 | Varaprasad et al. |
| 6,166,849 A | 12/2000 | Coleman et al. |
| 6,178,034 B1 | 1/2001 | Allemand et al. |
| 6,184,977 B1 | 2/2001 | Ishida |
| 6,204,953 B1 | 3/2001 | Zieba et al. |
| 6,207,083 B1 | 3/2001 | Varaprasad et al. |
| 6,225,640 B1 | 5/2001 | Glenn et al. |
| 6,228,662 B1 | 5/2001 | Hayashi et al. |
| 6,244,716 B1 | 6/2001 | Steenwyk et al. |
| 6,261,641 B1 | 7/2001 | Zieba et al. |
| 6,337,758 B1 | 1/2002 | Beteille et al. |
| 6,433,913 B1 | 8/2002 | Bauer et al. |
| 6,471,360 B2 | 10/2002 | Rukavina et al. |
| 6,493,128 B1 | 12/2002 | Agrawal et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,639,709 B2 | 10/2003 | Vincent et al. |
| 6,749,103 B1 | 6/2004 | Ivanov et al. |
| 6,750,662 B1 | 6/2004 | Van Der Heide |
| 6,783,099 B2 | 8/2004 | Rukavina et al. |
| 6,795,226 B2 | 9/2004 | Agrawal et al. |
| 6,798,556 B2 | 9/2004 | Tench et al. |
| 6,822,778 B2 | 11/2004 | Westfall et al. |
| 6,834,158 B1 | 12/2004 | Templeton |
| 6,853,472 B2 | 2/2005 | Warner et al. |
| 6,862,125 B2 | 3/2005 | Warner et al. |
| 6,878,900 B2 | 4/2005 | Corkum et al. |
| 6,906,842 B2 | 6/2005 | Agrawal et al. |
| 6,919,530 B2 | 7/2005 | Borgeson et al. |
| 6,937,380 B2 | 8/2005 | Fanton et al. |
| 6,995,891 B2 | 2/2006 | Agrawal et al. |
| 6,995,892 B2 | 2/2006 | Fanton et al. |
| 7,001,540 B2 | 2/2006 | Kloeppner |
| 7,002,720 B2 | 2/2006 | Beteille et al. |
| 7,004,592 B2 | 2/2006 | Varaprasad et al. |
| 7,033,655 B2 | 4/2006 | Beteille et al. |
| 7,114,643 B2 | 10/2006 | Ivanov et al. |
| 7,130,101 B2 | 10/2006 | Rukavina et al. |
| 7,133,181 B2 | 11/2006 | Greer |
| 7,146,703 B2 | 12/2006 | Ivanov |
| 7,173,750 B2 | 2/2007 | Rukavina |
| 7,202,987 B2 | 4/2007 | Varaprasad et al. |
| 7,230,748 B2 | 6/2007 | Giron et al. |
| 7,248,392 B2 | 7/2007 | Rukavina et al. |
| 7,256,923 B2 | 8/2007 | Liu et al. |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,333,258 B2 | 2/2008 | Yang et al. |
| 7,362,491 B2 | 4/2008 | Busick et al. |
| 7,372,610 B2 | 5/2008 | Burdis et al. |
| 7,450,294 B2 | 11/2008 | Weidner |
| 7,467,741 B2 | 12/2008 | Wickersham, Jr. et al. |
| 7,531,101 B2 | 5/2009 | Beteille |
| 7,649,668 B2 | 1/2010 | Fanton et al. |
| 7,687,740 B2 | 3/2010 | Bruland et al. |

(56) References Cited

U.S. PATENT DOCUMENTS

| | | |
|---|---|---|
| 7,710,671 B1 | 5/2010 | Kwak et al. |
| 7,719,751 B2 | 5/2010 | Egerton et al. |
| 7,724,416 B2 | 5/2010 | Miller |
| 7,869,114 B2 | 1/2011 | Valentin et al. |
| 7,894,119 B2 | 2/2011 | Valentin et al. |
| 7,929,194 B2 | 4/2011 | Legois et al. |
| 7,961,375 B2 | 6/2011 | Phillips |
| 7,990,603 B2 | 8/2011 | Ash et al. |
| 8,035,882 B2 | 10/2011 | Fanton et al. |
| 8,045,146 B2 | 10/2011 | Saito et al. |
| 8,164,818 B2 | 4/2012 | Collins et al. |
| 8,213,074 B1 | 7/2012 | Shrivastava et al. |
| 8,270,059 B2 | 9/2012 | Friedman et al. |
| 8,300,298 B2 | 10/2012 | Wang et al. |
| 8,432,603 B2 | 4/2013 | Wang et al. |
| 8,514,476 B2 | 8/2013 | Egerton et al. |
| 8,582,193 B2 | 11/2013 | Wang et al. |
| 8,749,870 B2 | 6/2014 | Egerton et al. |
| 8,764,950 B2 | 7/2014 | Wang et al. |
| 8,764,951 B2 | 7/2014 | Wang et al. |
| 8,780,432 B1 * | 7/2014 | Nguyen ............... G02F 1/1347 359/265 |
| 8,929,406 B2 | 1/2015 | Chuang et al. |
| 9,110,345 B2 | 8/2015 | Egerton et al. |
| 9,341,909 B2 | 5/2016 | Egerton et al. |
| 9,341,912 B2 | 5/2016 | Shrivastava et al. |
| 9,507,232 B2 | 11/2016 | Rozbicki et al. |
| 9,618,819 B2 | 4/2017 | Egerton et al. |
| 9,638,977 B2 | 5/2017 | Friedman et al. |
| 9,885,934 B2 | 2/2018 | Rozbicki et al. |
| 10,301,871 B2 | 5/2019 | Shrivastava et al. |
| 10,437,126 B2 | 10/2019 | Egerton et al. |
| 10,532,948 B2 | 1/2020 | Rozbicki et al. |
| 10,534,237 B2 | 1/2020 | Friedman et al. |
| 10,583,523 B2 | 3/2020 | Martin |
| 10,684,524 B2 | 6/2020 | Collins et al. |
| 2002/0021481 A1 | 2/2002 | Lin et al. |
| 2002/0041443 A1 | 4/2002 | Varaprasad et al. |
| 2002/0075552 A1 | 6/2002 | Poll et al. |
| 2002/0135881 A1 | 9/2002 | Rukavina et al. |
| 2002/0149829 A1 | 10/2002 | Mochizuka et al. |
| 2003/0081201 A1 | 5/2003 | Shibata et al. |
| 2003/0103108 A1 | 6/2003 | Liu et al. |
| 2003/0111447 A1 | 6/2003 | Corkum et al. |
| 2003/0227663 A1 | 12/2003 | Agrawal et al. |
| 2004/0047050 A1 | 3/2004 | Bauer et al. |
| 2004/0082252 A1 | 4/2004 | Liao et al. |
| 2004/0101981 A1 | 5/2004 | Morishita |
| 2004/0150866 A1 | 8/2004 | Tench et al. |
| 2004/0257633 A1 | 12/2004 | Agrawal et al. |
| 2005/0002081 A1 | 1/2005 | Beteille et al. |
| 2005/0168793 A1 | 8/2005 | Fanton et al. |
| 2006/0001801 A1 | 1/2006 | Kim et al. |
| 2006/0077511 A1 | 4/2006 | Poll et al. |
| 2006/0098264 A1 | 5/2006 | Park |
| 2006/0187608 A1 | 8/2006 | Stark |
| 2006/0193031 A1 | 8/2006 | Moore |
| 2006/0197462 A1 | 9/2006 | Uchiyama et al. |
| 2007/0002420 A1 | 1/2007 | Rukavina |
| 2007/0002422 A1 | 1/2007 | O'Shaughnessy |
| 2007/0020442 A1 | 1/2007 | Giron et al. |
| 2007/0067048 A1 | 3/2007 | Bechtel et al. |
| 2007/0081151 A1 | 4/2007 | Shortt |
| 2007/0092128 A1 | 4/2007 | Noy et al. |
| 2007/0097481 A1 | 5/2007 | Burdis et al. |
| 2007/0103761 A1 | 5/2007 | Giron et al. |
| 2007/0133078 A1 | 6/2007 | Fanton et al. |
| 2007/0141360 A1 | 6/2007 | Beteille |
| 2007/0268550 A1 | 11/2007 | Liu et al. |
| 2007/0289768 A1 | 12/2007 | Moore et al. |
| 2008/0042012 A1 | 2/2008 | Callahan et al. |
| 2008/0074724 A1 | 3/2008 | Agrawal et al. |
| 2008/0092456 A1 | 4/2008 | Millett et al. |
| 2008/0115428 A1 | 5/2008 | Schlam et al. |
| 2008/0128286 A1 | 6/2008 | Wu et al. |
| 2008/0178905 A1 | 7/2008 | Turner et al. |
| 2008/0204850 A1 | 8/2008 | Agrawal |
| 2008/0304130 A1 | 12/2008 | Nguyen |
| 2008/0304131 A1 | 12/2008 | Nguyen |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0127126 A1 | 5/2009 | Torvund |
| 2009/0130409 A1 | 5/2009 | Reutler et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0279079 A1 | 11/2009 | Shibata et al. |
| 2009/0297806 A1 | 12/2009 | Dawson-Elli et al. |
| 2009/0304970 A1 | 12/2009 | Imaizumi et al. |
| 2009/0323155 A1 | 12/2009 | Phillips |
| 2009/0323160 A1 | 12/2009 | Egerton et al. |
| 2010/0067090 A1 | 3/2010 | Egerton et al. |
| 2010/0074515 A1 | 3/2010 | Zhao et al. |
| 2010/0157278 A1 | 6/2010 | Horsch et al. |
| 2010/0203296 A1 | 8/2010 | Tsai et al. |
| 2010/0208326 A1 | 8/2010 | Kwak et al. |
| 2010/0225988 A1 | 9/2010 | Kalkanoglu et al. |
| 2010/0243427 A1 | 9/2010 | Kozlowski et al. |
| 2010/0245973 A1 | 9/2010 | Wang et al. |
| 2010/0311204 A1 * | 12/2010 | Komin ............... C23C 14/086 438/98 |
| 2011/0043885 A1 | 2/2011 | Lamine et al. |
| 2011/0045172 A1 | 2/2011 | Varaprasad et al. |
| 2011/0048614 A1 | 3/2011 | Veerasamy et al. |
| 2011/0051221 A1 | 3/2011 | Veerasamy |
| 2011/0059275 A1 | 3/2011 | Stark |
| 2011/0100709 A1 | 5/2011 | Wang et al. |
| 2011/0148218 A1 | 6/2011 | Rozbicki |
| 2011/0216389 A1 | 9/2011 | Piroux et al. |
| 2011/0260961 A1 | 10/2011 | Burdis |
| 2011/0266138 A1 | 11/2011 | Wang et al. |
| 2011/0267672 A1 | 11/2011 | Sbar et al. |
| 2011/0299149 A1 | 12/2011 | Park et al. |
| 2011/0304899 A1 | 12/2011 | Kwak et al. |
| 2012/0026573 A1 | 2/2012 | Collins et al. |
| 2012/0033287 A1 | 2/2012 | Friedman et al. |
| 2012/0069420 A1 | 3/2012 | Suzuki |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0287424 A1 | 11/2012 | Hori et al. |
| 2012/0300280 A1 | 11/2012 | Murphy et al. |
| 2012/0302121 A1 | 11/2012 | Sbar et al. |
| 2012/0327499 A1 | 12/2012 | Parker et al. |
| 2013/0021659 A1 | 1/2013 | Friedman et al. |
| 2013/0092679 A1 | 4/2013 | Rozbicki |
| 2013/0201545 A1 | 8/2013 | Frey et al. |
| 2013/0222877 A1 | 8/2013 | Greer et al. |
| 2013/0222878 A1 | 8/2013 | Greer et al. |
| 2013/0258436 A1 | 10/2013 | Podbelski et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0301104 A1 | 11/2013 | Egerton et al. |
| 2013/0306615 A1 | 11/2013 | Rozbicki et al. |
| 2014/0043667 A1 | 2/2014 | Bergh et al. |
| 2014/0055443 A1 | 2/2014 | Threlkel et al. |
| 2014/0133005 A1 | 5/2014 | Sbar et al. |
| 2014/0177028 A1 | 6/2014 | Shrivastava et al. |
| 2014/0320947 A1 | 10/2014 | Egerton et al. |
| 2015/0060648 A1 | 3/2015 | Brown et al. |
| 2015/0077829 A1 | 3/2015 | Greer et al. |
| 2015/0077831 A1 | 3/2015 | Friedman et al. |
| 2015/0092259 A1 | 4/2015 | Greer et al. |
| 2015/0097944 A1 | 4/2015 | Palm et al. |
| 2015/0108102 A1 | 4/2015 | Martin |
| 2015/0177586 A1 | 6/2015 | Egerton et al. |
| 2015/0338713 A1 | 11/2015 | Brown |

(56) References Cited

U.S. PATENT DOCUMENTS

| | | |
|---|---|---|
| 2015/0362817 A1 | 12/2015 | Patterson et al. |
| 2015/0362818 A1 | 12/2015 | Greer |
| 2016/0154290 A1 | 6/2016 | Brown et al. |
| 2016/0251894 A1 | 9/2016 | Shrivastava et al. |
| 2016/0306249 A1 | 10/2016 | Egerton et al. |
| 2016/0363799 A1 | 12/2016 | West et al. |
| 2017/0003566 A1 | 1/2017 | Friedman et al. |
| 2017/0044057 A1 | 2/2017 | Rozbicki et al. |
| 2017/0168367 A1 | 6/2017 | Egerton et al. |
| 2018/0180962 A1 | 6/2018 | Rozbicki et al. |
| 2018/0284555 A1 | 10/2018 | Klawuhn et al. |
| 2019/0169926 A1 | 6/2019 | Shrivastava et al. |
| 2019/0230776 A1 | 7/2019 | Casey et al. |
| 2019/0242184 A1 | 8/2019 | Shrivastava et al. |
| 2019/0243204 A1 | 8/2019 | Collins et al. |
| 2019/0302562 A1 | 10/2019 | Friedman et al. |
| 2020/0096830 A1 | 3/2020 | Sarrach et al. |

FOREIGN PATENT DOCUMENTS

| | | |
|---|---|---|
| CN | 1755437 A | 4/2006 |
| CN | 101274391 A | 10/2008 |
| CN | 101697040 A | 4/2010 |
| CN | 102388340 A | 3/2012 |
| CN | 103168269 A | 6/2013 |
| CN | 103238107 A | 8/2013 |
| CN | 103262280 A | 8/2013 |
| CN | 104321497 A | 1/2015 |
| CN | 104781493 A | 7/2015 |
| DE | 102006042538 | 3/2008 |
| DE | 102014220818 A1 | 4/2016 |
| EP | 0356099 A2 | 2/1990 |
| EP | 0470867 | 2/1992 |
| EP | 0851271 A2 | 7/1998 |
| EP | 0950568 A1 | 10/1999 |
| EP | 0958882 A2 | 11/1999 |
| EP | 1012661 A | 6/2000 |
| EP | 1420287 A1 | 5/2004 |
| EP | 1484634 A1 | 12/2004 |
| EP | 2036652 A1 | 3/2009 |
| EP | 2348357 | 7/2011 |
| EP | 2714321 A1 | 4/2014 |
| EP | 2815960 A | 12/2014 |
| FR | 2957159 A1 | 9/2011 |
| GB | 2190760 A | 11/1987 |
| JP | S55-153982 A | 12/1980 |
| JP | S56-35125 A | 4/1981 |
| JP | S58-93591 A | 6/1983 |
| JP | S61-082821 U | 5/1986 |
| JP | S61-176012 A | 8/1986 |
| JP | S61-190815 A | 8/1986 |
| JP | S61-171034 U | 10/1986 |
| JP | S61-229610 A | 10/1986 |
| JP | S62-019631 U | 2/1987 |
| JP | H01-270032 A | 10/1989 |
| JP | H02-176728 A | 7/1990 |
| JP | H02-308228 A | 12/1990 |
| JP | H05-173191 A | 7/1993 |
| JP | H07-028099 A | 1/1995 |
| JP | H07-139201 A | 5/1995 |
| JP | H10-58169 A | 3/1998 |
| JP | 2001-066418 A | 3/2001 |
| JP | 2002-249346 | 9/2002 |
| JP | 2003-146072 A | 5/2003 |
| JP | 2004-093873 | 3/2004 |
| JP | 2004-531770 | 10/2004 |
| JP | 2006-243485 A | 9/2006 |
| JP | 2007-205724 A | 8/2007 |
| JP | 2007-248604 A | 9/2007 |
| JP | 2008-507000 | 3/2008 |
| JP | 2009-198230 A | 9/2009 |
| KR | 10-2007-0099216 A | 10/2007 |
| KR | 10-0838656 B1 | 6/2008 |
| KR | 10-2011-0084703 A | 7/2011 |
| KR | 10-2012-0127171 A | 11/2012 |
| TW | 201116918 A | 5/2011 |
| WO | WO1998/038547 | 9/1998 |
| WO | WO1999/005566 | 2/1999 |
| WO | WO2003/001290 | 1/2003 |
| WO | WO03/012541 A2 | 2/2003 |
| WO | WO03/012541 A3 | 2/2003 |
| WO | WO2004/034138 A1 | 4/2004 |
| WO | WO2005/076061 | 8/2005 |
| WO | WO2006/052067 | 5/2006 |
| WO | WO2007/100921 A2 | 9/2007 |
| WO | WO2008/043951 | 4/2008 |
| WO | WO2009/145876 | 12/2009 |
| WO | WO2009/148861 | 12/2009 |
| WO | WO2009/158510 | 12/2009 |
| WO | WO2010/120535 A2 | 10/2010 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2011/133294 A1 | 10/2011 |
| WO | WO2012/145155 | 10/2012 |
| WO | WO2012/154320 A1 | 11/2012 |
| WO | WO2013/039915 A1 | 3/2013 |
| WO | WO2013/090209 A1 | 6/2013 |
| WO | WO2013/130781 A1 | 9/2013 |
| WO | WO2013/138535 A1 | 9/2013 |
| WO | WO2013/173591 A1 | 11/2013 |
| WO | WO2014/078429 | 5/2014 |
| WO | WO2015/050946 A1 | 4/2015 |
| WO | WO2015/095615 A1 | 6/2015 |
| WO | WO2015/171886 | 11/2015 |
| WO | WO2016/058695 A1 | 4/2016 |
| WO | WO2016/085964 | 6/2016 |
| WO | WO2017/059362 A1 | 4/2017 |
| WO | WO2017/075472 | 5/2017 |
| WO | WO2018/034933 A1 | 3/2018 |
| WO | WO2018/039433 A1 | 3/2018 |
| WO | WO2018/119095 A1 | 6/2018 |

OTHER PUBLICATIONS

Preliminary Amendment for U.S. Appl. No. 15/094,897, filed May 13, 2016.
U.S. Office Action dated Nov. 8, 2012 for U.S. Appl. No. 12/145,892.
U.S. Office Action dated May 25, 2012 for U.S. Appl. No. 12/145,892.
U.S. Office Action dated Feb. 3, 2011 for U.S. Appl. No. 12/145,892.
U.S. Office Action dated Aug. 19, 2010 for U.S. Appl. No. 12/145,892.
U.S. Notice of Allowance dated Feb. 25, 2013 for U.S. Appl. No. 12/145,892.
U.S. Office Action dated Oct. 3, 2013 for U.S. Appl. No. 13/903,905.
U.S. Notice of Allowance dated Apr. 14, 2014 for U.S. Appl. No. 13/903,905.
U.S. Office Action dated Aug. 11, 2014 for U.S. Appl. No. 14/266,576.
U.S. Final Office Action dated Jan. 22, 2015 for U.S. Appl. No. 14/266,576.
U.S. Notice of Allowance dated Apr. 30, 2015 for U.S. Appl. No. 14/266,576.
U.S. Office Action dated Jun. 5, 2015 for U.S. Appl. No. 14/137,644.
Notice of Allowance dated Jan. 14, 2016 for U.S. Appl. No. 14/137,644.
U.S. Office Action dated Jul. 2, 2015 for U.S. Appl. No. 14/608,452.
U.S. Notice of Allowance dated Jan. 15, 2016 for U.S. Appl. No. 14/608,452.
U.S. Notice of Allowance dated Nov. 30, 2016 for for U.S. Appl. No. 15/130,819.
U.S. Notice of Allowance dated Mar. 11, 2010 for U.S. Appl. No. 12/212,482.
CN Office Action dated Dec. 5, 2012 for CN200980124126.7.
CN Office Action dated Sep. 4, 2013 for CN200980124126.7.
CN Office Action dated Apr. 18, 2016 for CN Application No. 201380059263.3.
CN Office Action dated Dec. 14, 2016 for CN Application No. 201380059263.3.
EP Search Report dated Mar. 20, 2012 in EP09771042.0.

(56) References Cited

OTHER PUBLICATIONS

EP Search Report dated Jun. 25, 2015 for EP09815048.5.
EP Search Report dated Sep. 23, 2015 for EP15160755.3.
Partial EP Search Report dated May 20, 2016 for EP13855151.0.
Extended EP Search Report dated Jul. 13, 2016 for EP13855151.0.
International Preliminary Report on Patentability dated Jan. 13, 2011 in PCT/US2009/048679.
International Search Report and Written Opinion dated Feb. 17, 2010 in PCT/US2009/048679.
International Preliminary Report on Patentability dated Mar. 22, 2011 from PCT/US2009/56928.
International Search Report and Written Opinion dated May 4, 2010 from PCT/US2009/56928.
International Preliminary Report on Patentability dated May 28, 2015 in in PCT/US2013/069913.
International Search Report and Written Opinion dated Feb. 18, 2014 in PCT/US2013/069913.
International Search Report and Written Opinion dated Dec. 13, 2016, issued in PCT/US16/55005.
International Search Report dated Mar. 17, 2015 in PCT/US2014/071314.
JP Office Action dated Oct. 9, 2012 for JP2011-516666.
JP Office Action dated Apr. 5, 2013 for JP2011-516666.
E.S. Lee et al., Advancement of Electrochromic Windows. California Energy Commission, PIER. Publication No. CEC-500-2006-052, Apr. 2006.
Tseng, C-Y et al., "Improved performance mechanism of III-V compound triple-junction solar cell using hybrid electrode structure," Solar Energy, vol. 89, Jan. 19, 2013, pp. 17-22.
Preliminary Amendment for U.S. Appl. No. 15/444,152, filed Apr. 13, 2017.
U.S. Office Action dated Nov. 3, 2017 for U.S. Appl. No. 15/444,152.
U.S. Office Action dated Jul. 3, 2017 for U.S. Appl. No. 15/094,897.
CN Office Action dated Jun. 26, 2017 in CN201380059263.3.
EP Extended Search Report dated Jun. 21, 2017 in EP14872953.6.
U.S. Office Action dated Feb. 8, 2016 in U.S. Appl. No. 13/610,612.
U.S. Notice of Allowance dated Jul. 19, 2016 in U.S. Appl. No. 13/610,612.
U.S. Notice of Allowance dated Sep. 14, 2016 (supplemental) in U.S. Appl. No. 13/610,612.
U.S. Office Action dated Mar. 24, 2016 in U.S. Appl. No. 13/859,623.
U.S. Office Action dated Jan. 6, 2017 in U.S. Appl. No. 13/859,623.
U.S. Office Action dated Mar. 11, 2016 in U.S. Appl. No. 14/384,146.
U.S. Notice of Allowance dated Aug. 15, 2016 in U.S. Appl. No. 14/384,146.
U.S. Office Action dated Jan. 12, 2017 in U.S. Appl. No. 14/384,146.
U.S. Notice of Allowance dated Mar. 7, 2017 in U.S. Appl. No. 14/384,146.
U.S. Office Action dated Jan. 11, 2018 in U.S. Appl. No. 15/252,099.
U.S. Office Action dated Jun. 12, 2017 in U.S. Appl. No. 14/398,117.
U.S. Final Office Action dated Feb. 28, 2018 in U.S. Appl. No. 14/398,117.
U.S. Notice of Allowance dated Sep. 7, 2017 in U.S. Appl. No. 13/859,623.
International Search Report dated Jan. 31, 2013 in PCT Application No. PCT/US2012/054665.
International Preliminary Report on Patentability dated Mar. 27, 2014 in PCT Application No. PCT/US2012/054665.
International Search Report dated Aug. 4, 2014 in PCT Application No. PCT/US2014/033059.
International Preliminary Report on Patentability dated Jul. 29, 2015 in PCT Application No. PCT/US2014/033059.
International Search Report dated Jun. 4, 2013 in PCT Application No. PCT/US2013/031098.
International Preliminary Report on Patentability dated Sep. 25, 2014 in PCT Application No. PCT/US2013/031098.
International Search Report and Written Opinion for PCT/US2013/041365 dated Aug. 27, 2013.
TW Office Action dated Jul. 11, 2017 in TW Application No. 105138289.

EP Intention to Grant & Annex with Complementary Search dated Apr. 19, 2018 in EP09815048.5.
International Preliminary Report on Patentability dated Apr. 12, 2018 in PCT/US16/55005.
International Preliminary Report on Patentability dated Jun. 30, 2016 in PCT/US2014/071314.
U.S. Office Action dated Jun. 12, 2012 in U.S. Appl. No. 12/336,466.
U.S. Final Office Action dated Oct. 30, 2012 in U.S. Appl. No. 12/336,466.
U.S. Office Action dated Sep. 13, 2013 in U.S. Appl. No. 12/336,466.
U.S. Office Action dated May 9, 2014 in U.S. Appl. No. 12/336,466.
U.S. Final Office Action dated Mar. 18, 2015 in U.S. Appl. No. 12/336,466.
U.S. Office Action dated Jul. 5, 2016 in U.S. Appl. No. 12/336,466.
U.S. Final Office Action dated Mar. 14, 2017 in U.S. Appl. No. 12/336,466.
U.S. Office Action dated Nov. 30, 2017 in U.S. Appl. No. 12/336,466.
U.S. Appl. No. 12/336,466, filed Dec. 16, 2008, McMeeking.
U.S. Appl. No. 15/833,924, filed Dec. 6, 2017, Rozbicki et al.
U.S. Appl. No. 15/762,077, filed Mar. 21, 2018, Klawuhn et al.
U.S. Final Office Action dated Jun. 14, 2018 for U.S. Appl. No. 15/444,152.
U.S. Final Office Action dated May 3, 2018 for U.S. Appl. No. 15/094,897.
U.S. Notice of Allowance dated Jan. 15, 2019 for U.S. Appl. No. 15/094,897.
U.S. Office Action dated Dec. 27, 2018 in U.S. Appl. No. 15/283,151.
U.S. Notice of Allowance dated Dec. 18, 2018 in U.S. Appl. No. 15/252,099.
U.S. Office Action dated Nov. 29, 2018 in U.S. Appl. No. 14/398,117.
EP Extended European Search Report dated Oct. 15, 2018 in EP Application No. EP 18169307.8.
CN Office Action dated Mar. 13, 2017 in CN Application No. 201380025529.2.
CN Office Action dated Oct. 31, 2018 in CN Application No. 201710684104.2.
TW Office Action dated Oct. 22, 2018 in TW Application No. TW 107129732.
U.S. Preliminary Amendment dated Nov. 19, 2018 in U.S. Appl. No. 16/191,138.
U.S. Final Office Action dated Nov. 1, 2018 in U.S. Appl. No. 12/336,466.
U.S. Appl. No. 16/191,138, filed Nov. 14, 2018, Shrivastava et al.
U.S. Notice of Allowance dated May 29, 2019 for U.S. Appl. No. 15/444,152.
CN Office Action dated Mar. 5, 2019 in CN Application No. 201480068660.1, with translations.
Summons to Attend Oral Proceedings and Communication dated Apr. 17, 2019 in in EP Application No. 13855151.0.
EP Partial Supplemental Search Report dated Apr. 12, 2019 in EP Application No. 16852784.4.
EP Extended Search Report dated May 16, 2019 in EP Application No. 16852784.4.
U.S. Office Action dated Aug. 7, 2019 in U.S. Appl. No. 16/267,260.
U.S. Notice of Allowance dated May 30, 2019 in U.S. Appl. No. 15/252,099.
U.S. Final Office Action dated Jun. 27, 2019 in U.S. Appl. No. 14/398,117.
EP Office Action dated Apr. 29, 2019 for EP Application No. 13791156.6.
Preliminary Amendment filed Jun. 18, 2019 in U.S. Appl. No. 16/443,585.
U.S. Appl. No. 16/443,585, filed Jun. 17, 2019, Friedman et al.
Canadian Office Action dated Oct. 1, 2019 in CA Application No. 2890749.
Chinese Office Action dated Sep. 29, 2019 in CN Application No. 201480068660.1.
Chinese Office Action dated Aug. 23, 2019 in CN Application No. 201680063892.7.
U.S. Notice of Allowance dated Sep. 5, 2019 in U.S. Appl. No. 15/283,151.
U.S. Notice of Allowance dated Sep. 12, 2019 in U.S. Appl. No. 15/252,099.

(56) References Cited

OTHER PUBLICATIONS

U.S. Notice of Allowance dated Oct. 23, 2019 in U.S. Appl. No. 14/398,117.
EP Examination Report dated Oct. 29, 2019 for EP Application No. 12832253.4.
EP Office Action dated Sep. 16, 2019 in EP Application No. EP 18169307.8.
CN Office Action dated Aug. 14, 2019 in CN Application No. 201710684104.2.
Wang, S., "Laser Process Apparatus and Technology," Huazhong University of Science and Technology Press, Sep. 30, 2011, p. 86, [No trans. provided].
Notice of Allowance dated Apr. 28, 2020, in CN Application No. 201480068660.1, with search report indication no additional prior art, No Translation.
Canadian Office Action, dated Apr. 9, 2020, in CA Patent Application No. 2,908,820.
U.S. Notice of Allowance dated Jan. 27, 2020 in U.S. Appl. No. 16/267,260.
U.S. Office Action dated Feb. 19, 2020 in U.S. Appl. No. 15/833,924.
CN Office Action dated Feb. 28, 2020 in CN Application No. 201710684104.2.
U.S. Office Action dated Jan. 23, 2020 for U.S. Appl. No. 15/762,077.
EP Office Action dated Mar. 20, 2020 in EP Application No. 16852784.4.
U.S. Appl. No. 16/748,638, filed Jan. 21, 2020, Todd William Martin.
U.S. Preliminary Amendment dated Apr. 10, 2020 in U.S. Appl. No. 16/748,638.

\* cited by examiner

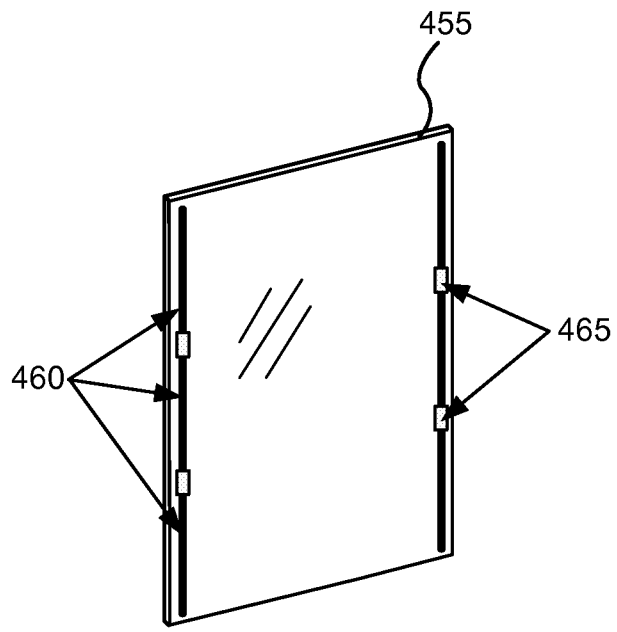
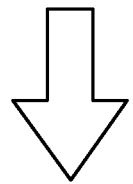
Fig. 4F
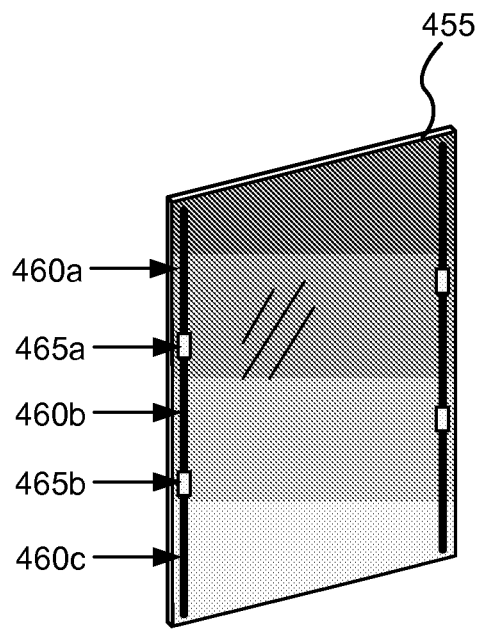

MULTI-ZONE EC WINDOWS

CROSS-REFERENCES TO RELATED APPLICATIONS

This application is a national stage application under 35 U.S.C. § 371 to International Application PCT/US14/71314 (designating the United States), titled "MULTI-ZONE EC WINDOWS" and filed on Dec. 18, 2014, which claims benefit of and priority to U.S. patent application Ser. No. 14/137,644, titled "MULTI-ZONE EC WINDOWS," filed on Dec. 20, 2013; both of which are hereby incorporated by reference in their entireties and for all purposes.

This application is also a continuation-in-part application of U.S. patent application Ser. No. 15/094,897, filed on Apr. 8, 2016 and titled "MULTI-ZONE EC WINDOWS," which is a continuation application of U.S. patent application Ser. No. 14/137,644 (now U.S. Pat. No. 9,341,912), filed on Dec. 20, 2013 and titled "MULTI-ZONE EC WINDOWS;" all of which are hereby incorporated by reference in their entireties and for all purposes.

U.S. patent application Ser. No. 14/137,644 is a continuation-in-part application of International Application PCT/US13/069913 (designating the United States), filed on Nov. 13, 2013 and titled "MULTI-ZONE EC WINDOWS," which claims benefit of and priority to U.S. Provisional Patent Application No. 61/725,980, filed on Nov. 13, 2012 and titled "MULTI-ZONE EC WINDOWS" and to U.S. Provisional Patent Application No. 61/740,651, filed on Dec. 21, 2012 and titled "MULTI-ZONE EC WINDOWS;" all of which are hereby incorporated by reference in their entireties and for all purposes.

U.S. patent application Ser. No. 14/137,644 is also a continuation-in-part application of International Application PCT/US13/031098, filed on Mar. 13, 2013 and titled "PINHOLE MITIGATION FOR OPTICAL DEVICES," which claims benefit of and priority of U.S. Provisional Patent Application No. 61/610,241, filed on Mar. 13, 2012 and titled "PINHOLE MITIGATION FOR OPTICAL DEVICES;" all of which are hereby incorporated by reference in their entireties and for all purposes.

FIELD

Embodiments disclosed herein relate generally to optical devices, and more particularly to methods of fabricating optical devices and particularly to electrochromic (EC) windows having multiple tinting zones.

BACKGROUND

Electrochromism is a phenomenon in which a material exhibits a reversible electrochemically-mediated change in an optical property when placed in a different electronic state, typically by being subjected to a voltage change. The optical property is typically one or more of tint, transmittance, absorbance, and reflectance. For example, one well known electrochromic material is tungsten oxide ($WO_3$). Tungsten oxide is a cathodically tinting electrochromic material in which a tinting transition, bleached (untinted) to blue, occurs by electrochemical reduction. When electrochemical oxidation takes place, tungsten oxide transitions from blue to a bleached state.

Electrochromic materials may be incorporated into, for example, windows for home, commercial and other uses. The tint, transmittance, absorbance, and/or reflectance of such windows may be changed by inducing a change in the electrochromic material, that is, electrochromic windows are windows that can be darkened and lightened reversibly via application of an electric charge. A small voltage applied to an electrochromic device of the window will cause it to darken; reversing the voltage causes it to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite much recent advancement in electrochromic technology, apparatus, and related methods of making and/or using electrochromic devices.

SUMMARY

Thin-film devices, for example, electrochromic devices for windows, and methods of manufacturing are described. Embodiments include electrochromic window lites having two or more tinting (or coloration) zones, where there is only a single monolithic electrochromic device on the lite. Certain embodiments include constructs, e.g. laminates, IGUs and the like, that have two EC lites, panes, where one of the panes has EC zones, and the other pane may have a monolithic EC device coating or also be a zoned EC coating. Tinting zones are defined by virtue of the means for applying potential to the device and/or by a resistive zone between adjacent tinting zones. For example, sets of bus bars are configured to apply potential across separate zones (areas) of the device and thereby tint them selectively. The advantages include no visible scribe lines in the viewable area of the EC window due to, e.g., cutting through the EC device to make separate devices that serve as tinting zones. Embodiments that include two EC panes may include a multi-zone EC pane where the zones are formed by cutting through the EC device coating, i.e. the other EC pane is used to mask or otherwise conceal or ameliorate the visual distraction caused by the through cuts on the other pane.

One embodiment is an electrochromic window lite including a monolithic EC device on a transparent substrate, the monolithic EC device including two or more tinting zones, each of said two or more tinting zones configured for operation independent of the others and each having a pair of associated bus bars, where the two or more tinting zones are not separated from each other by isolation scribes. That is, the EC device stack is not cut through, but rather is intact as a monolithic device. For example, there may be two tinting zones on the lite and the associated bus bars arranged are located at opposing edges of the lite (e.g., vertically oriented), wherein a set of bus bars is associated with each of the two tinting zones.

Bus bars may be configured to enhance coloring of tinting zones. In certain embodiments, bus bars have varying width along their length; the varying width of the bus bars may enhance the tinting front and/or promote selective tinting in a particular tinting zone via voltage gradients. In other embodiments, bus bars may be composites, having both high electrically conductive regions and resistive regions, configured to enhance tinting fronts and/or promote selective tinting in a particular tinting zone via voltage gradients. One embodiment is directed to an electrochromic window lite comprising a monolithic EC device on a transparent substrate and at least one pair of lengthwise variable bus bars configured to produce a tint gradient zone on the monolithic EC device when energized.

In certain embodiments, the two or more tinting zones are separated by a resistive zone which inhibits, at least partially, the flow of electrons, ions or both across the resistive zone. Resistive zones may, e.g., be parallel to bus bars and/or orthogonal to bus bars. Resistive zones may include modification of the EC device and/or one or both transparent conductor layers (TCOs) of the EC device. Monolithic EC lites having two or more tinting zones may be integrated into insulating glass units (IGUs) and/or laminates (singly or as part of an IGU). The mate lite may or may not also be an electrochromic lite, and may or may not also have tinting zones.

One embodiment is directed to an electrochromic window lite comprising a monolithic EC device disposed on a transparent substrate and a resistive zone. The monolithic EC device is comprised of first and second transparent conductor layers and an EC stack between the first and second transparent conductor layers. The resistive zone in one of the first and second transparent conducting layers. The resistive zone has a higher electrical resistance than a portion of the one of the first and second transparent conducting layers outside the resistive zone. In one case, the resistive zone is a linear region in the one of the first and second transparent conducting layer with thinner or absent material.

Certain aspects of the disclosure pertain to an electrochromic window lite that may be characterized by the following features: a monolithic EC device on a transparent substrate, the monolithic EC device comprising: two or more tinting zones, each of the two or more tinting zones configured for operation independent of the others and having an associated pair of bus bars. In certain embodiments, the two or more tinting zones contain only a partial cut through the uppermost TCO of the monolithic EC device to form a resistive zone between each of said two or more tinting zones. An associated pair of bus bars means that each zone may have a pair of bus bars that are exclusive to that zone and not shared with any other zone, or two or more zones may share a common bus bar, but in either case no two zones share the same pair of bus bars.

In certain embodiments, the associated bus bars located at opposing edges for each of the two tinting zones. In certain embodiments, the electrochromic window lite is incorporated into an insulated glass unit, which may have a mate lite that is (i) not an electrochromic lite or (ii) a monolithic electrochromic lite with a single tinting zone, or (iii) a monolithic electrochromic lite with two or more tinting zones (where the tinting zones of the mate lite may be aligned with those of the electrochromic window lite), or (iv) an electrochromic lite with three or more tinting zones. In such embodiments, the electrochromic window lite may be configured to tint in one or more tinting zones to <1% T.

In some implementations, the resistive zone substantially spans across the monolithic EC device. In some implementations, the resistive zone is between about 1 nm wide and about 10 nm wide. In certain embodiments, the resistive zone is formed by removing between about 10% and about 90% of the uppermost TCO material along the resistive zone. As an example, the resistive zone may be formed by laser irradiation of the uppermost TCO. As a further example, each of the two or more tinting zones associated bus bars are formed by laser irradiation during formation of the resistive zone by cutting through a single bus bar.

Other aspects of the disclosure pertain to methods of forming a monolithic EC device comprising two tinting zones, where the methods may be characterized by the following operations: (a) forming the monolithic EC device; (b) applying a single bus bar to the top TCO of the monolithic EC device; (c) cutting through the single bus bar along its width; and, (d) cutting at least part way through the top TCO, but not through the electrode layer adjacent to the top TCO, to form a resistive zone between the two tinting zones. In certain embodiments, operation (c) forms separate bus bars for each of the two tinting zones from the single bus bar. In some implementations, operations (c) and (d) are performed in a single cutting step.

In some implementations, the resistive zone substantially spans the width of the monolithic EC device. In certain embodiments, the resistive zone is between about 1 nm wide and about 10 nm wide. In certain embodiments, the resistive zone is formed by removing between about 10% and about 90% of the uppermost TCO material along the resistive zone. As an example, the resistive zone may be formed by laser irradiation of the uppermost TCO.

Zoning in EC windows may be used in certain applications, e.g., a window is made darker at the top to control glare, while the bottom portion is lighter so user view is maintained and more light still enters the room than would otherwise with a monolithic EC coating fully tinted to reduce glare.

Another aspect of the disclosure concerns electrochromic window lites (panes) characterized by the following features: an EC device on a transparent substrate, the EC device comprising bus bars; a region of the transparent substrate that is not covered by the EC device, where the region capable of providing, when not mitigated, a bright spot or bright region when the EC device is tinted; and an obscuring material over the region, wherein the material has a lower transmittance than the substrate. In some embodiments, the region is a pinhole, a scribe line, or an edge line.

Yet another aspect of the disclosure concerns methods of obscuring a potentially bright area produced by a region of a transparent substrate that is not covered by an EC device. Such methods may be characterized by the following operations: (a) providing an electrochromic lite having the EC device coating on a substrate; (b) identifying a site of the potentially bright area on the substrate; and (c) applying an obscuring material to the site. The obscuring material has a lower transmittance than the substrate. In certain embodiments, the region is a pinhole, a scribe line, or an edge line.

These and other features and advantages will be described in further detail below, with reference to the associated drawings.

BRIEF DESCRIPTION OF THE DRAWINGS

The following detailed description can be more fully understood when considered in conjunction with the drawings in which:

FIGS. 4D-H depict EC lites, each having a gradient tinting zone.

DETAILED DESCRIPTION

Certain embodiments are directed to optical devices, that is, thin-film devices having at least one transparent conductor layer. In the simplest form, an optical device includes a substrate and one or more material layers sandwiched between two conductor layers, one of which is transparent. In one embodiment, an optical device includes a transparent substrate and two transparent conductor layers. Certain embodiments described herein, although not limited as such, work particularly well with solid state and inorganic electrochromic devices.

Figure 1:
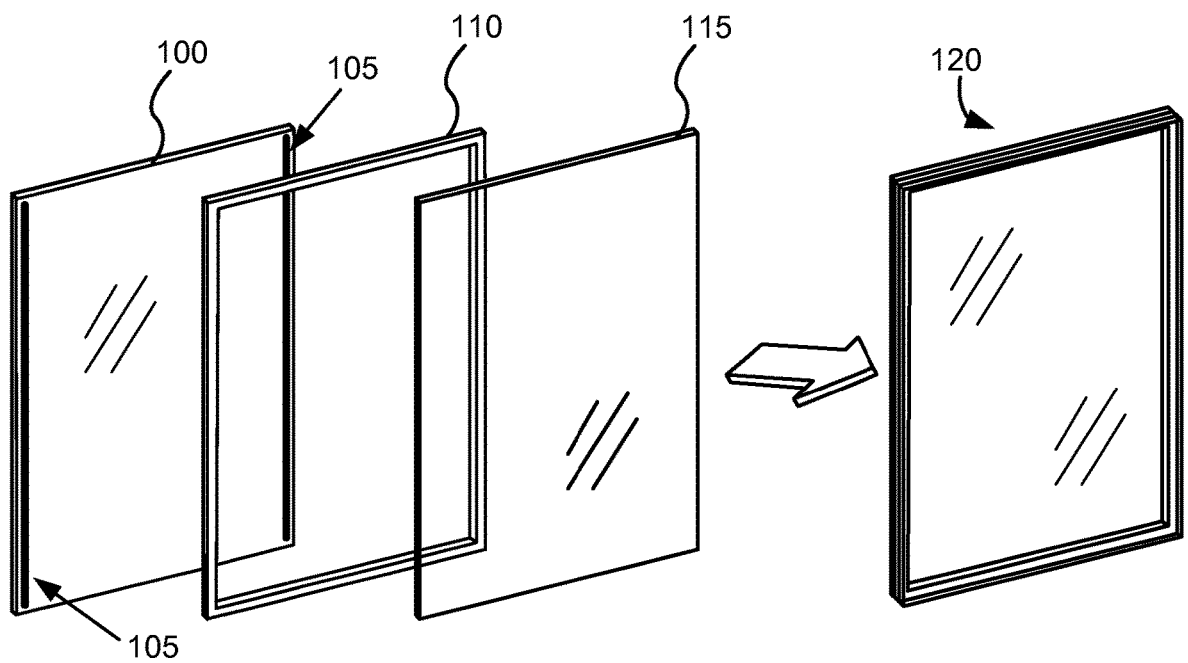
FIG. 1 depicts fabrication of an IGU with an EC lite and associated tinting schemes.
Figure 1:
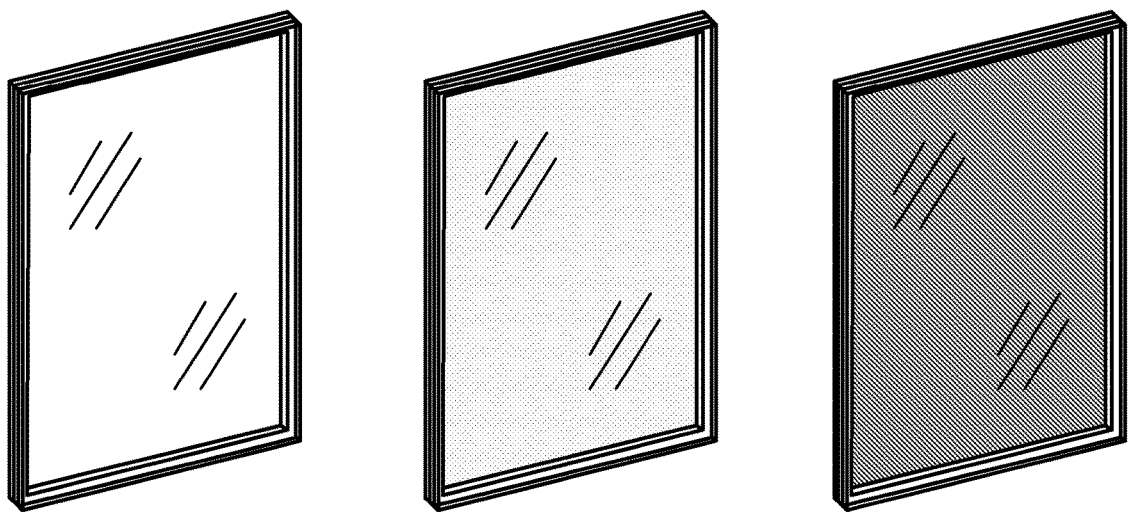

FIG. 1 depicts fabrication of an IGU, 120, with an EC lite, 100, which includes a monolithic EC device and associated pair of bus bars, 105, which energize the device each via a transparent conductor, the pair of transparent conductors sandwich the EC materials between them so that a potential can be applied across the device materials. The IGU is fabricated by combining EC lite 100 with a spacer, 110, and a mate lite, 115, along with the appropriate sealants and wiring (not shown) to the bus bars. In some applications, a second set of spacer and mate lite may be added (i.e. Triple Pane IGU). The two mate lites may be of different types. As depicted on the bottom half of FIG. 1, the IGU can be transparent (left), tinted to an intermediate state (middle) or fully tinted (right). However, there is no possibility of tinting the viewable area of the lite in different areas or "zones." Conventional technology does exist to achieve this end, however.

Figure 2A:
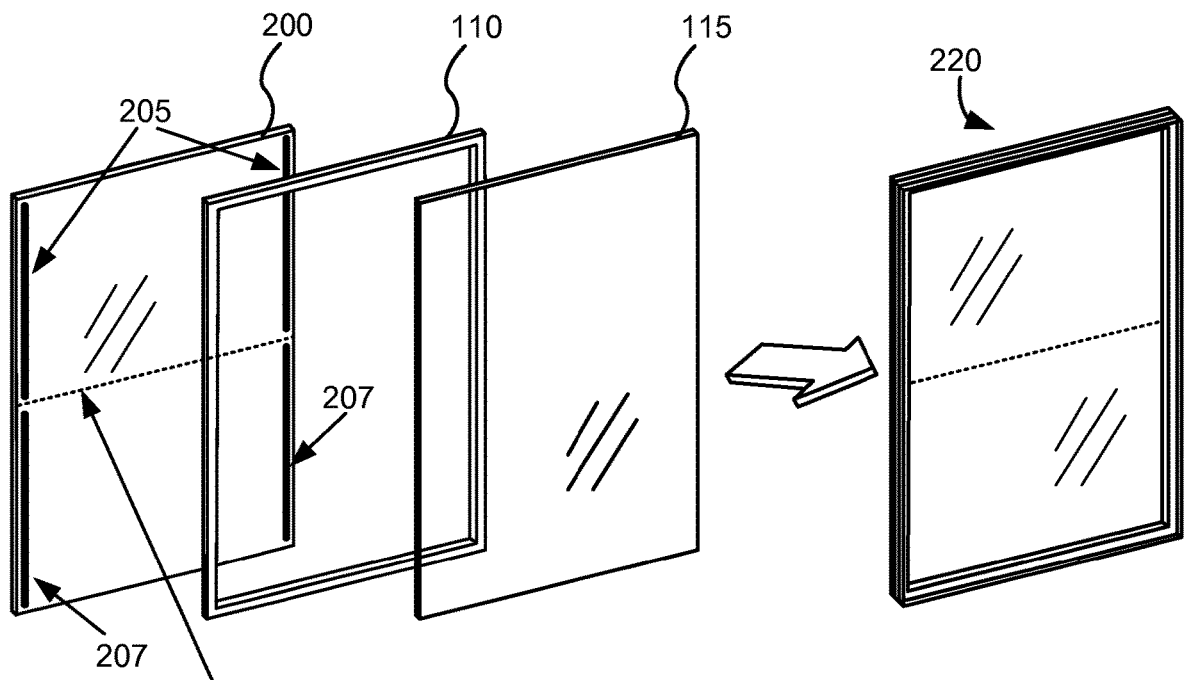
FIGS. 2A and 2B depict an IGU having an EC lite with two tinting zones delineated by laser scribe, and associated tinting schemes, respectively.

FIG. 2A depicts an IGU, 220, having an EC lite, 200, with two tinting zones delineated by laser scribe, 225. Each tinting zone has an associated pair of bus bars, 205 and 207, respectively. The EC lite 200 may be incorporated into an IGU, 220, as described in relation to FIG. 1. Scribe line 225 cuts through both of the transparent conductor layers which sandwich the electrochromic materials, along with the EC device layer(s), so that there effectively two EC devices, one corresponding to each tinting zone, on the EC lite 200. Scribe line 225 may not be visually discernible when the EC lite is not tinted, as depicted in FIG. 2A, i.e. in the untinted state (bleached or neutral state).

Figure 2B:
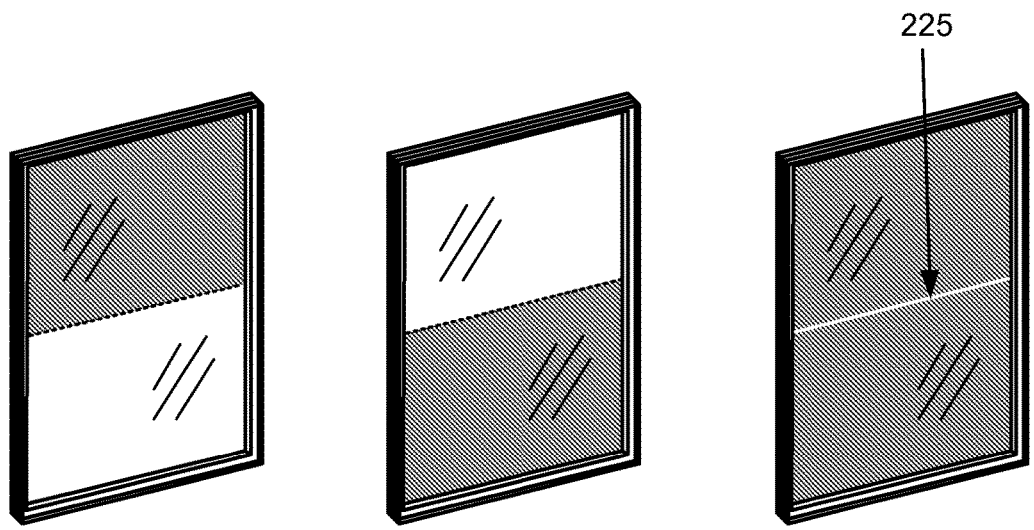

FIG. 2B depicts three possible tinting schemes of IGU 220. As shown, IGU 220 may have the top zone tinted and the bottom zone untinted (left), the top zone untinted and the bottom zone tinted (middle) or both the top and bottom zones tinted (right). Although such windows offer flexibility in tinting, when both zones are tinted, scribe line 225 is visually discernible and is unattractive to an end user because there is a bright line across the middle of the viewable area of the window. This is because the EC material in the area has been destroyed and/or deactivated from the scribe line that cut through the device. The bright line can be quite distracting; either when one is looking at the window itself, or as in most cases, when the end user is trying to view things through the window. The bright line against a tinted background catches one's eye immediately. Many approaches have been taken to create tinting zones in optical devices, but they all involve some sort of physical segmentation of a monolithic optical device into two or more individually operable devices. That is, the functionality of the EC device is destroyed along the scribe line, thus effectively creating two devices from a monolithic single device. Certain embodiments described herein avoid destroying the EC device function between adjacent tinting zones.

One approach to overcoming the visually distracting bright line created by a laser scribe in the viewable area of an EC lite is to apply a tinted material to the lite, e.g. on the scribe line or on an opposing side of the lite, in order to obscure or minimize the light passing through the scribe area. Thus, when tinting zones adjoining the scribe are tinted, the scribe line will be less discernible to the end user. When neither of the adjoining tinting zones is tinted, the tinted material in the scribe line area will be almost or completely indiscernible because it is a thin tinted line against a large untinted background, which is harder to see than a bright line against a tinted background. The thin tinted line need not be opaque, a limited amount of absorption of the visible spectrum can be used, e.g., absorption that will tone down the bright line created when the full spectrum emanates through scribe line 225. Methods for obscuring pinhole defects in optical devices are described in, for example, described in U.S. Provisional Patent Application Ser. No. 61/610,241, filed Mar. 13, 2012, and described in PCT Application Serial No. PCT/US2013/031098 filed on Mar. 13, 2013, which are both hereby incorporated by reference in their entirety. Whether obscuring pin holes, scribe lines, edge lines, or the like, the methods obscure bright areas on EC devices, e.g. by applying tinted material to such areas to make them harder to see to the end user. Edge lines exist where a coating such as a monolithic electrochromic coating, does not extend to the spacer of an IGU (e.g., element 110 of FIG. 2A). In this region, a bright line or wider area is visible when viewing the IGU directly. As understood by those of skill in the art, the obscuring methods described in the present application and in PCT/US2013/031098 have equal applicability to pin holes, edge lines, scribe lines, and the like. The methods described in the aforementioned patent application are particularly useful for obscuring scribe or edge lines in the visible area of an optical device such as an EC device. One embodiment is a method of obscuring a scribe line in the viewable area of an EC window, the method including applying a method used to obscure pinholes as described in the aforementioned US/PCT Patent application. For example, one method includes applying a tinted material to the scribe line and optionally the area adjacent the scribe line. In another example, the glass at the bottom of the scribe line trench (and optionally some adjoining area) is altered so as to diffuse light that passes therethrough, thus ameliorating the "bright line" effect.

Tinting Zones

As discussed above, certain embodiments described herein avoid destroying the EC device functionality between adjacent tinting zones. Though scribe lines may be visually obscured by application of tinted materials to the lite as described above, the inventors have found that it may be often preferable to maintain the functional integrity of a monolithic EC device, rather than scribe it into discrete devices and thus conventional tinting zones. The inventors have discovered that tinting zones may be created by: 1) configuring the powering mechanism (e.g. bus bars, wiring thereto and associated powering algorithms) of the optical device appropriately, 2) configuring the EC device such that adjacent tinting zones are separated by a resistive zone, or 3) combination of 1) and 2). For example, number 1) may be achieved by appropriately configuring one or more bus bars such that they can be activated independently of other bus bars on the same monolithic EC device. Thus tinting zones are created without the need to physically separate individual EC devices to create corresponding tinting zones. In another example, a resistive zone allows coloration and bleaching of adjacent tinting zones on a single EC device without destroying functionality in the resistive zone itself. A resistive zone can refer to an area of the monolithic optical device, e.g. an EC device, where the function is impaired but not destroyed. Typically, the functionality in the resistive zone is merely slowed relative to the rest of the device. Impairment might include diminished capacity for ion movement in one or more of the layers of the EC device and/or reduced density of the ions. The change in EC stack properties and/or ion density maybe done during deposition/fabrication of the EC stack or post-deposition through a thermal/laser irradiation treatment. For example, one or more EC device layers may be made denser than it otherwise would be in the bulk functioning device and therefore be able to hold fewer ions and/or allow ion passage through the denser material, and therefore color less intensely than the bulk device, but still function. A resistive zone is achieved in at least one of the following ways: i) the electrical resistivity of one or both of the transparent conductor layers is impaired, ii) one or both of the transparent conductor layers is cut, without cutting through the optical device stack therebetween, iii) the function of the optical device stack (not including the transparent conductor layers) is impaired, and iv) combinations of i)-iv). For example, a resistive zone may be created where one or both of the transparent conductor layers is fabricated thinner or absent, e.g. along a linear region, so as to increase electrical resistivity along the linear region of the resistive zone. In another example, one of the transparent conductor layers may be cut along the width of the device, while the other transparent conductor is left intact, either of uniform thickness or thinner, along the resistive zone. In yet another example, the function of the EC device may be inhibited along a line, so that it resists ion transport, while the transparent conductor layers may or may not be altered along the same line. Resistive zones are described in more detail below in terms of specific, but non-limiting examples. If the resistive zone is in one of the transparent layers, the other transparent layer may be left intact (e.g., uniform composition and thickness).

Configuring Powering Mechanism of EC Devices

One embodiment is an electrochromic window lite including a monolithic EC device on a transparent substrate, the monolithic EC device including two or more tinting zones, each of the two or more tinting zones configured for operation independent of the others and having an associated pair of bus bars. In certain embodiments, the two or more tinting zones are not separated from each other by isolation scribes; that is, the EC device and associated transparent conductors do not have isolation scribes that cut through any of these layers. For example, there may be two tinting zones on the EC lite and two pairs of bus bars, wherein each pair is associated with a tinting zone and both pairs are located at or near opposing edges of the EC lite e.g., the bus bars may be vertically oriented at or near opposing vertical edges with a set of bus bars for each of the two tinting zones. Such lites may be integrated into insulating glass units (IGUs).

Figure 3A:
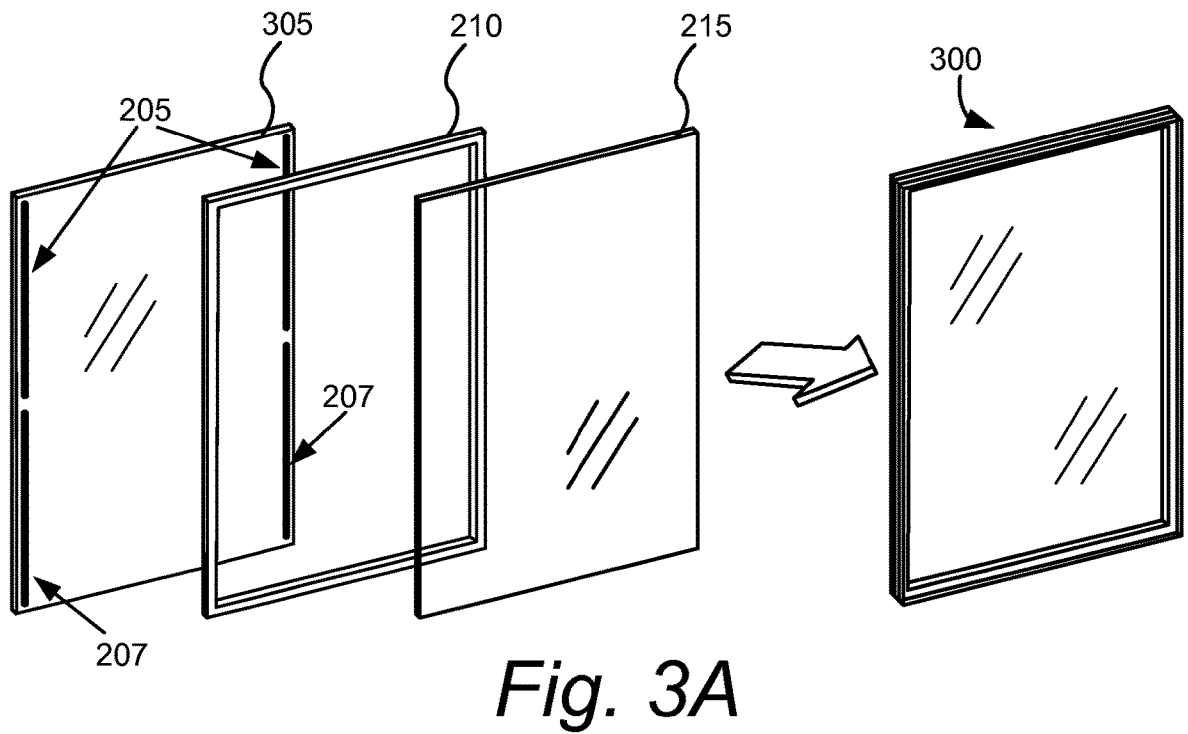
FIGS. 3A and 3B depict fabrication of an IGU with an EC lite having tinting zones configured on a monolithic EC device and associated tinting schemes, respectively.
Figure 3B:
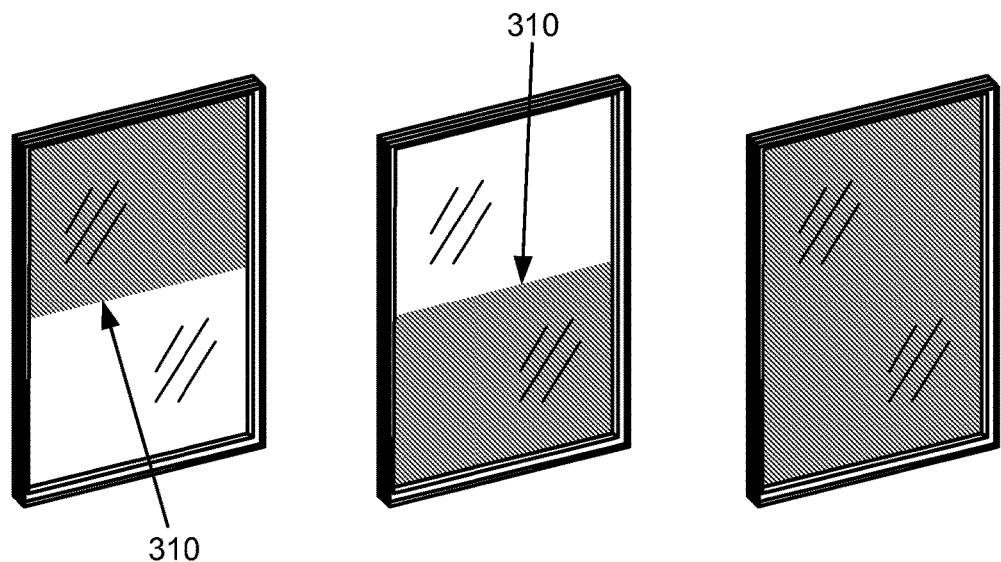

FIG. 3A depicts fabrication of an IGU, 300, with an EC lite, 305 having two tinting zones (upper and lower tinting zones) configured on a monolithic EC device. In this example, there are no laser scribes or other physical sectioning (e.g. bifurcation) of the monolithic EC device or transparent conductor layers on the lite. Each of bus bar pairs, 205 and 207, is configured to energize independently of each other. Thus, referring to FIG. 3B, IGU 300 has three tinting schemes besides the untinted state (bleached or neutral state) depicted in FIG. 3A. FIG. 3B shows these three tinting schemes where the top zone may be tinted while the bottom zone is not (left), the bottom zone may be tinted while the top zone is not (middle), or both zones may be tinted (right). In contrast to an EC lite having two distinct EC devices by virtue of being divided by a scribe line, each tinting zone of lite 305, when tinted, has a "tinting front" 310. A tinting front can refer to an area of the EC device where the potential applied across the devices TCOs by the bus bars reaches a level that is insufficient to tint the device (e.g. by movement of ions through the layers of the device to balance charge). Thus, in the example depicted, the tinting front 310 corresponds roughly to where the charge is bleeding off into the area of the transparent conductor that is between the pair of bus bars that are not energized.

Figure 3C:
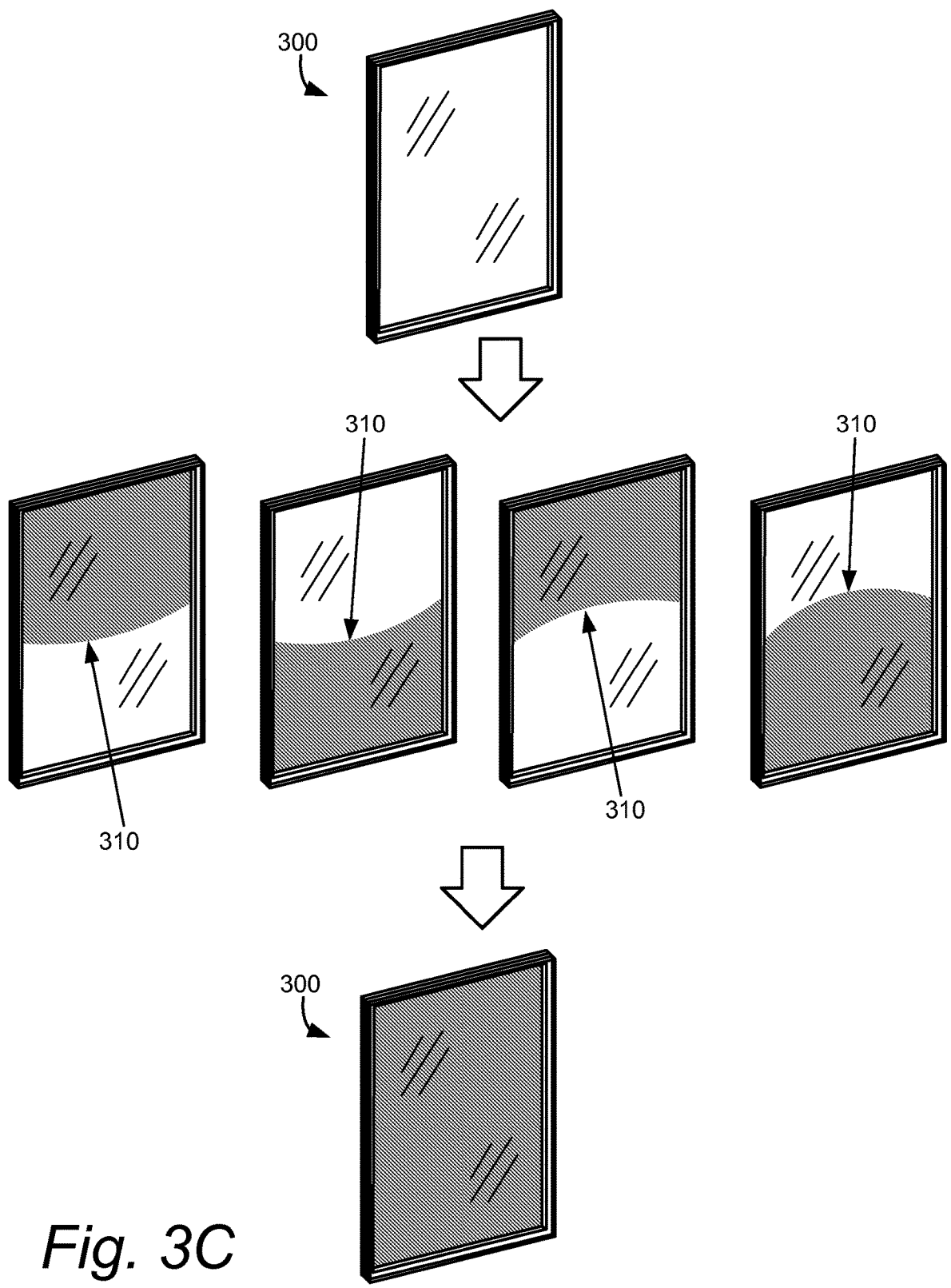
FIG. 3C depicts various tinting schemes as a function of tinting front of tinting zones.

The shape of a tinting front may depend upon the charging characteristics of the transparent conductors, the configuration of the bus bars, wiring and powering thereto, and the like. The tinting front may be linear, curved (convex, concave, etc.), zigzag, irregular, etc. For example, FIG. 3B depicts the tinting front 310 as a linear phenomenon; that is, the tinting front 310 is depicted as located along a straight line. As another example, FIG. 3C depicts various tinting schemes as a function of tinting front of each of the tinting zones, in this case lower and upper tinting zones. In the illustrated example, the tinting front is curved (e.g., concave or convex) along the tinting front. In certain embodiments, it may be desirable that when both tinting zones are tinted, the tinting of the EC lite is total and uniform. Thus a convex tinting front may be desirable, so a complimentary concave tinting front may be used in an adjacent zone, or another convex tinting front may be used to ensure sufficient charge reaches the entire device for uniform tinting. In certain cases, the tinting front may not be a clean line as depicted in FIGS. 3B and 3C, but rather have a diffuse appearance along the tinting front due to the charge bleeding off into the adjacent tinting zone which is not powered at the time.

In the case where two adjacent zones are tinted, but one zone's tinting level is different than the other, e.g., where one zone is tinted to 5% T and the other adjacent zone tinted to 20% T, there may be no noticeable tinting front. That is, the two zones' tinting may blends into each other for a uniform gradient tinting appearance, e.g. resembling a shading effect, where the coloration is darkest in one zone and appears to gradually lighten into and including the adjacent zone. In the event that individual tinting zones on a monolithic EC device have aesthetically unappealing coloration fronts, one may apply tinting voltages to all zones, but where the tinting voltages to individual zones are the same or different. One embodiment is a method of controlling a monolithic EC device coating, including tinting two adjacent zones simultaneously by virtue of selective application of voltage to different areas of the monolithic EC device.

In certain embodiments, when the EC lite with tinting zones is incorporated into an IGU or a laminate for example, the mate lite may also be an EC lite, having tinting zones or not. Insulated glass unit constructions having two or more (monolithic) EC lites are described in U.S. Pat. No. 8,270,059, which is hereby incorporated by reference in its entirety. Having two EC lites in a single IGU has advantages including the ability to make a near opaque window (e.g. privacy glass), where the percent transmission (% T) of the IGU is <1%. Also, if the EC lites are two-state (tinted or bleached) there may be certain tinting combinations made possible, e.g. a four-tint-state window. If the EC lites are capable of intermediate states, the tinting possibilities may be virtually endless. One embodiment is an IGU having a first EC lite having two or more tinting zones and a mate lite that is a monolithic EC lite. In another embodiment, the mate lite also has two or more tinting zones. In this latter embodiment, the tinting zones may or may not be the same in number or aligned with the tinting zones of the first EC lite with which it is registered in the IGU. Exemplary constructs illustrating these descriptions follow.

Figure 3D:
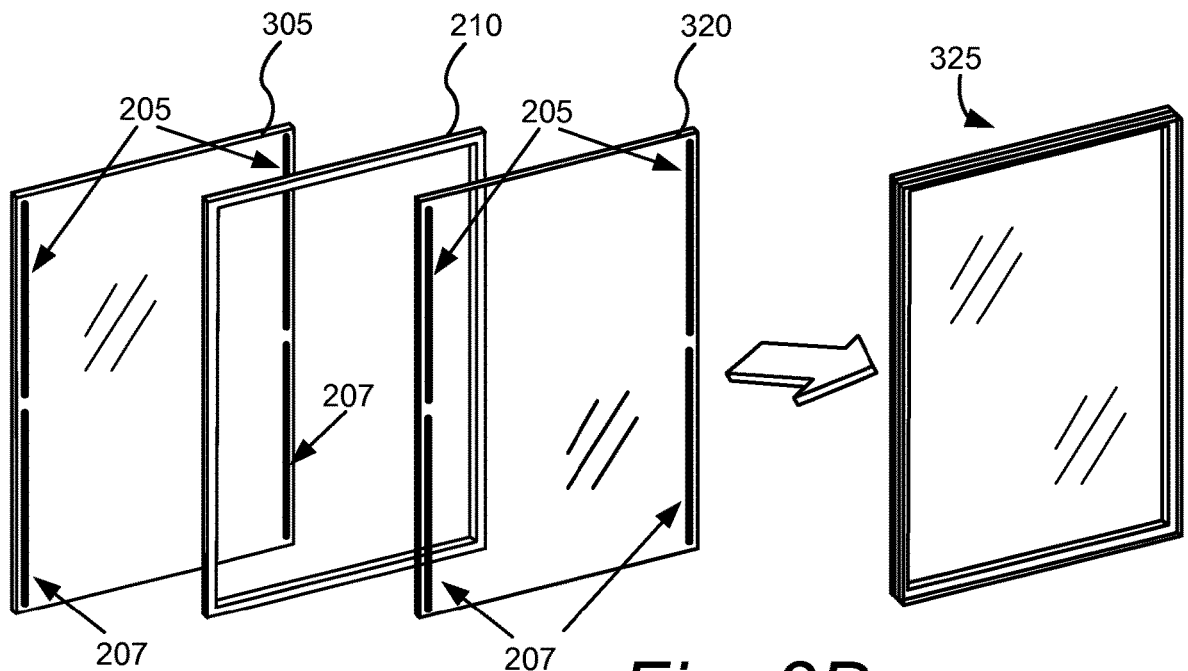
FIGS. 3D and 3E depict fabrication of an IGU having two EC lites, where each of the EC lites has two tinting zones, and associated tinting schemes, respectively.
Figure 3E:
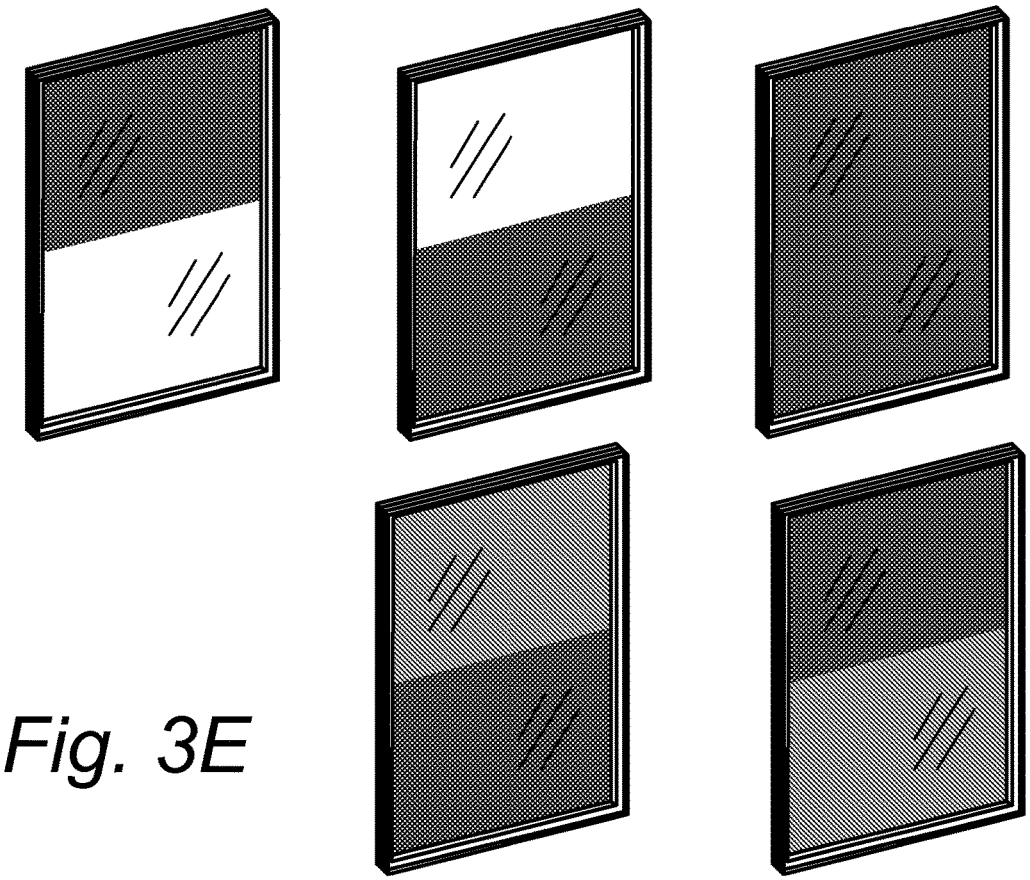

FIG. 3D depicts fabrication of an IGU, 325, having two EC lites, 305 and 320, where each of the EC lites has two tinting zones, each of the tinting zones created by appropriately configured bus bar pairs, 205 and 207 at or near two opposing edges. In this illustrated example, the tinting zones of EC lites 305 and 320 are registered, that is, they are aligned with each other and of the same area, but this need not be the configuration. For example, the tinting fronts from opposing EC lites 305 and 320 could overlap each other when tinted in another embodiment. FIG. 3D depicts IGU 325 in an untinted state (bleached or neutral state). Also, each of the tinting zones is capable of only two states, tinted or bleached. Even so, this enables a wide range of tinting schemes for IGU 325. Besides the untinted state, IGU 325 is capable of many tint states (e.g., eight tint states). FIG. 3B depicts three of the possible tint states (i.e. where one EC lite of IGU 325 is tinted in one of the three configurations shown in FIG. 3B). FIG. 3E depicts another five possible tint states for IGU 325. If the top tinting zones of both EC lites are tinted simultaneously, and the bottom two zones are not, then the top half of the IGU is very dark, while the bottom is untinted (top left IGU). If both of the top tinting zones are not tinted, and the bottom two zones are tinted, then the bottom half of the IGU is very dark, while the top is untinted (top middle IGU). If all four zones of the EC lites are tinted, then the entire window is very dark (top right IGU). For example, the combined tinting of all tinting zones in two registered EC lites can achieve <1% T. If one of the top zones in the EC lites is tinted and both of the bottom zones are tinted, then the tint state on the bottom left of FIG. 3E is created. Likewise, if one of the bottom zones is tinted and both of the top zones are tinted, then the tint state on the bottom right of FIG. 3E is created.

One embodiment is an IGU having two or more EC lites, wherein at least two of the two or more EC lites includes multiple tinting zones as described herein. The tinting zones may be formed physically in the coating, i.e. by bifurcation of a monolithic coating, forming a resistive zone in a monolithic EC coating, or both; or a monolithic coating with no resistive zones may be controlled by selective application of voltages to different areas to form tinting zones. One embodiment is an IGU or laminate having two or more EC lites, where a first of the two or more EC lites includes multiple tinting zones created by conventional isolation scribes, and a second of the two or more EC lites includes tinting zones as described herein by techniques other than isolation scribes. One embodiment is an IGU or laminate having two or more EC lites, where a first of the two or more EC lites includes multiple tinting zones, and a second of the two or more EC lites includes a monolithic EC coating without tinting zones.

Configurations such as those depicted in FIGS. 3B and 3E may be particularly useful in applications such as creating day lighting zones vs. occupant (glare) control zones. The day lighting zones may also be tinted but at lower tint level than the glare control zones for the optimal user experience, e.g. day lighting zones may be tinted to % Tvis~4%-30% while the glare control zones may be tinted to % Tvis~0.1-1%. Day lighting transoms are very common. For example, creating "virtual transoms" with a piece of glass and thus removing the frame and associated glazier labor has a cost benefit as well as better sight lines. Also, having a variety of tint states such as those depicted in FIGS. 3B and 3E allows for customization of room lighting based on the amount and location of the sun striking individual windows.

Certain embodiments pertain to methods of transitioning an EC lite having two or more tinting zones. In one embodiment, an EC lite having three or more tinting zones is transitioned across the three or more tinted zones from a first zone at one edge of the device, to a second adjacent tinting zone, and then to a third tinting zone, adjacent to the second zone. In other words, the tinting zones are used to give the effect of drawing a physical shade across the window, without actually having a physical shade, since EC windows may eliminate the need for physical shades. Such methods may be implemented with conventional zoned EC lites or those described herein. This is illustrated in FIGS. 4A-C with respect to an EC lite of an embodiment.

Figure 4A:
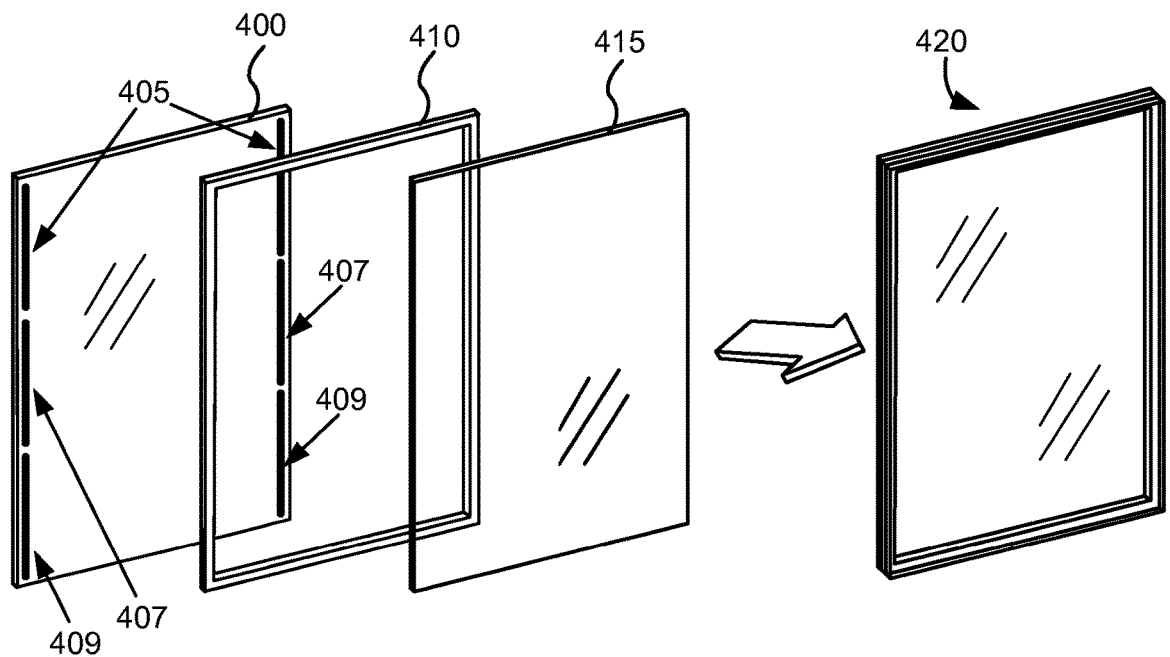
FIGS. 4A-C depict fabrication of an IGU with an EC lite and associated tinting schemes, respectively.

Referring to FIG. 4A, an EC lite, 400, is configured with a first set of bus bars, 405, a second set of bus bars 407, and a third set of bus bars, 409. The three sets of bus bars are configured so as to create three tinting zones, respectively. Although EC lite 400 in FIG. 4A is incorporated into an IGU, 420, using a spacer 410 and a mate lite 415, lamination to a mate lite (EC lite or otherwise) or use as a single EC lite is also possible.

Figure 4B:
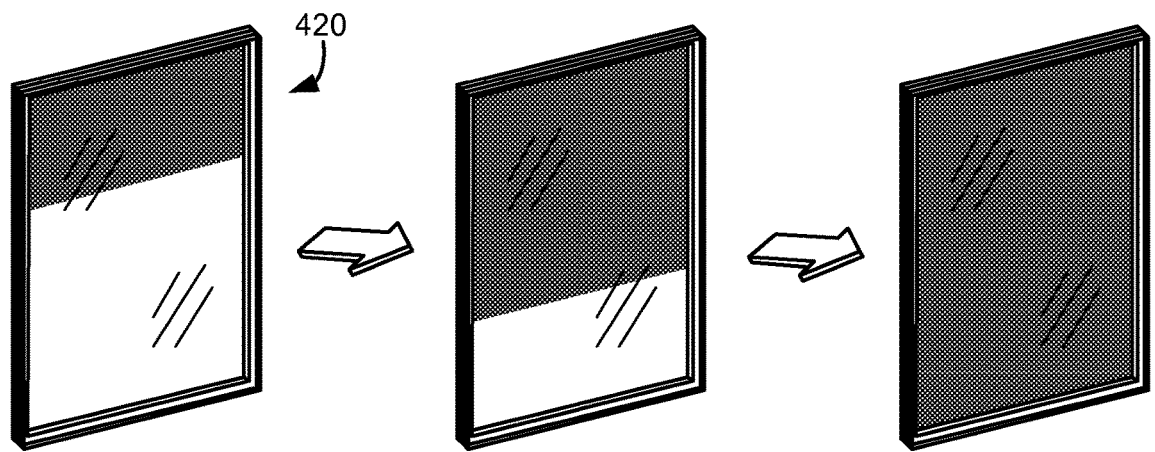
Figure 4C:
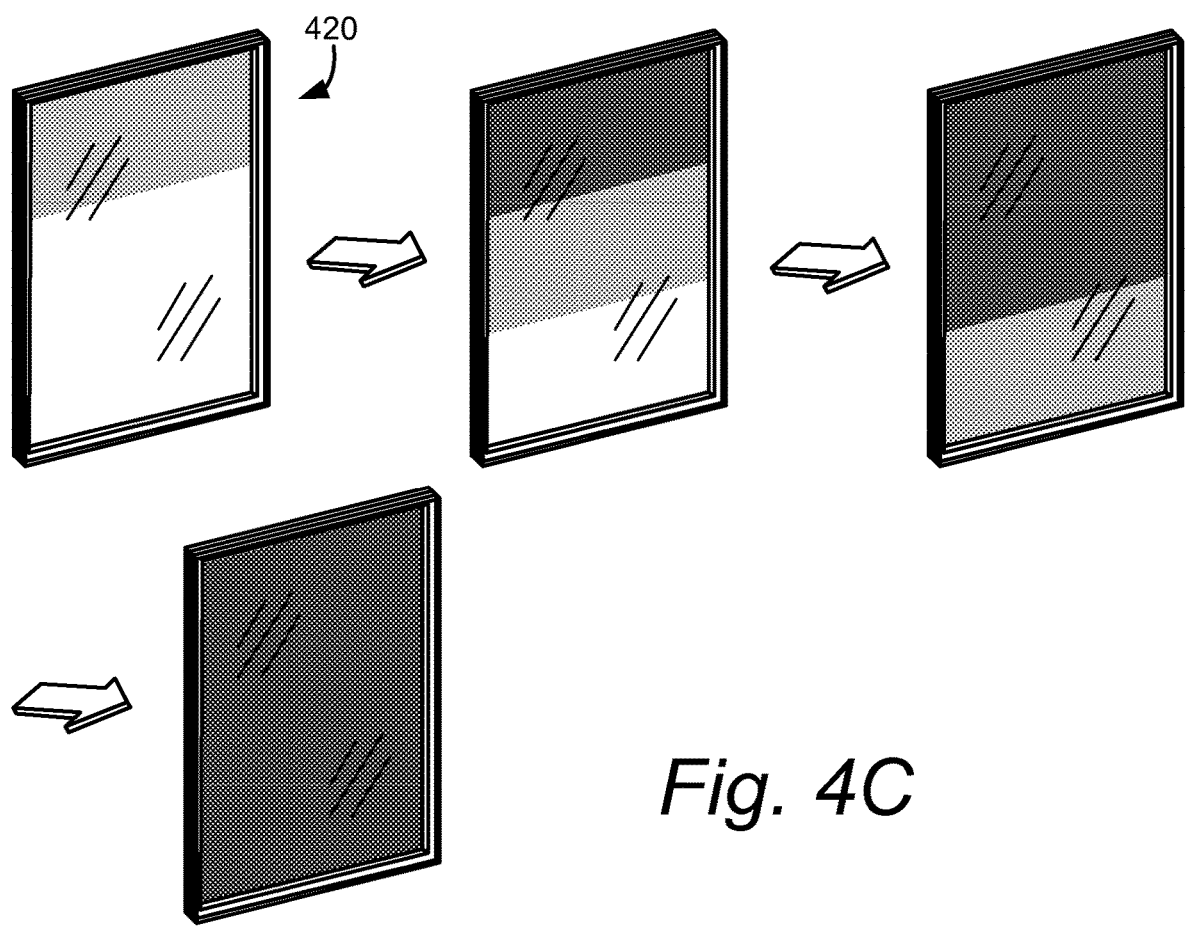

Referring to FIG. 4B, assuming that each of the tinting zones is tinted as a two-state zone, then the three tinting zones may be activated sequentially, e.g. from top to bottom as depicted, to create a physical shade effect, i.e. as if one were lowering a roller shade or drawing a Roman shade over the window. For example, the top zone may be fully tinted, then the second zone may be fully tinted, finally the third zone may be fully tinted. The tinting zones could be sequentially tinted from the bottom up or in the middle and then the upper and lower zones tinted, depending upon the desired effect.

Another method is to tint the tinting zones as described with respect to FIG. 4B, except that before transition in a particular tinting zone is complete, transition in an adjacent tinting zone begins, which can also create a shading effect. In the illustrated example of FIG. 4C, the top tinting zone's tinting is initiated (top left), but before tinting is complete in the top zone, the middle zone's tinting is initiated. Once the top zone's tinting is complete, the middle zone's tinting is not yet complete (top center). At some point during the transition of the middle zone, the bottom zone's tinting is initiated. Once the middle zone's tinting is complete, the bottom zone's tinting is not yet complete (top right), thus the top and middle zones are fully tinted and the bottom zone's tinting is yet to be completed. Finally, the bottom zone is fully tinted. Using tinting zones with intermediate state capability, rather than two-state "tint or not," will increase the possible variations of tinting schemes.

Lengthwise Variable Bus Bars

In certain embodiments, an EC lite may be configured to have one or more tint gradient zones. In these embodiments, the EC lite has an EC device, such as, e.g., a monolithic EC device on a transparent substrate, and also has at least one pair of bus bars with geometry and/or material composition that varies along their lengths to vary electrical resistance lengthwise (lengthwise variable bus bars). This variation in resistance can produce a lengthwise gradient in the voltage applied to the EC device supplied across bus bars ($V_{app}$) and a lengthwise gradient in the local effective voltage ($V_{eff}$) in the EC device. The term $V_{eff}$ refers to the potential between the positive and negative transparent conducting layers at any particular location on the EC device. The lengthwise gradient of the $V_{eff}$ may generate a corresponding tint gradient zone that varies lengthwise in a region between the pair of bus bars when energized. In these embodiments, the lengthwise variable bus bars will have resistance profiles along their lengths that are functions of both the local bus bar geometry and resistivity. In certain embodiments, the bus bars are designed so that the resistance is lowest at one end of the bus bar and highest at the other end of the bus bar. Other designs are possible, such as designs where the resistance is lowest in the middle of a bus bar and highest at the ends of the bus bar. A description of voltage profiles in various EC devices powered by bus bars can be found in U.S. patent application Ser. No. 13/682,618, titled "DRIVING THIN FILM SWITCHABLE OPTICAL DEVICES," filed on Nov. 20, 2013, which is hereby incorporated by reference in its entirety.

Figure 4D:
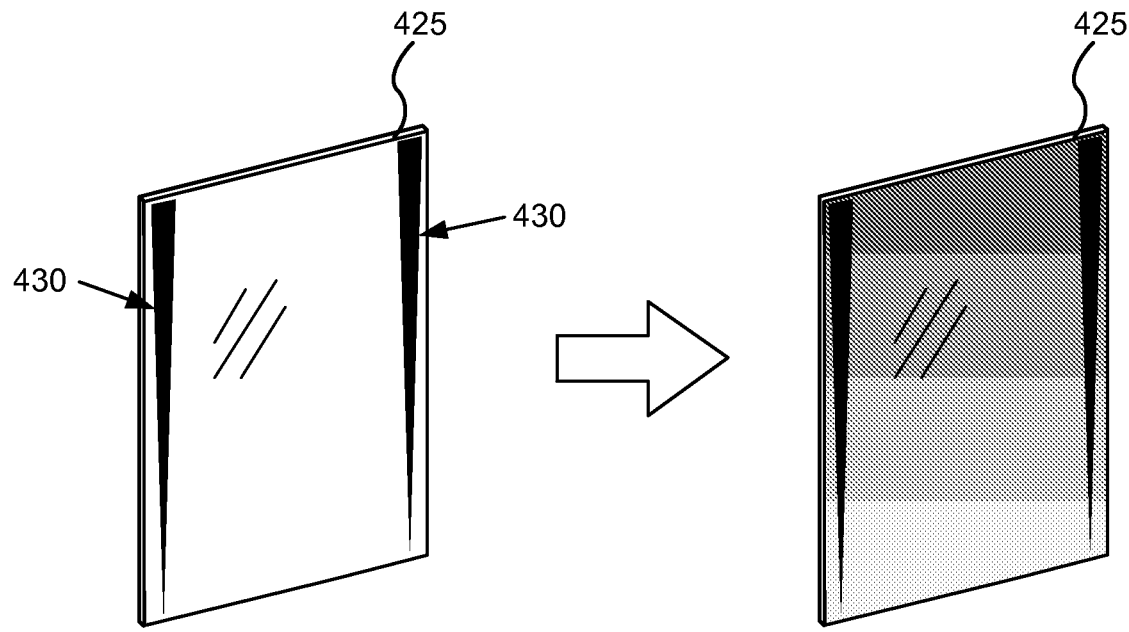
Figure 4E:
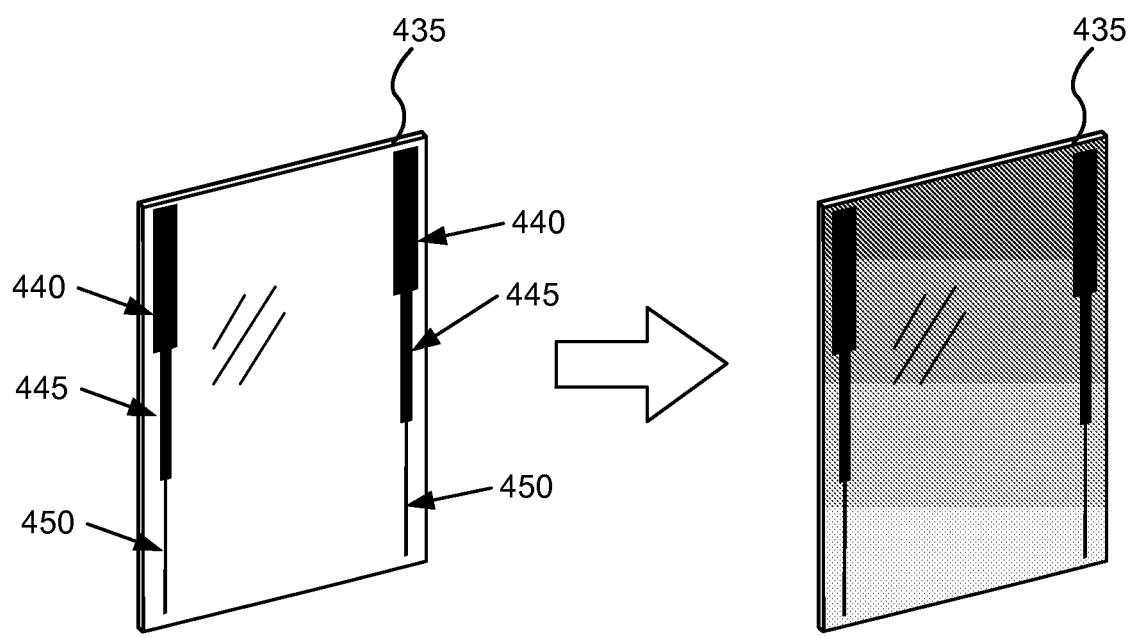

EC devices configured, e.g., as described in relation to FIGS. 4D and 4E, in addition to being capable of tinting in a gradient fashion as depicted, may also, e.g. upon application of sufficient voltage, tint to a uniform coloration. For example, a maximum (and uniform) tinting may be achieved across the monolithic device coating by application of sufficient voltage using bus bars also configured to apply a gradient voltage (and give the gradient tinting shown).

The local material composition of a bus bar may determine its local resistivity. It is contemplated that the bus bar material composition, and therefore the bus bar resistivity may vary along the length of the bus bar in certain embodiments. The resistivity can be tailored based on various compositional adjustments known to those of skill in the art. For example, resistivity can be adjusted by adjusting the concentration of a conductive material in the bus bar composition. In some embodiments, bus bars are made from a conductive ink such as a silver ink. By varying the concentration of silver in the ink along the length of the bus bar, one can produce a bus bar in which the resistivity likewise varies along the length. The resistivity can also be varied by other compositional adjustments such as the local inclusion of resistive materials in the bus bar or the variation of the composition of a conductive component to adjust its resistivity. Slight variations in composition can change the resistivity of certain conductive materials such as conductive polymers. In certain embodiments, the electrical conductivity of the bus bar material is constant, but the thickness and/or width of the bus bar varies along its length.

The value of the voltage that can be applied at any position on the bus bar is a function of the location where the bus bar connects to an external power source and the resistance profile of the bus bar. A bus bar may be connected to the source of electrical power at locations where the bus bar has least resistance, although this is not required. The value of the voltage will be greatest at the locations where the power source connection attaches to the bus bars. The decrease in voltage away from the connection is determined by the distance from the connection and the resistance profile of the bus bars along the path from the connection to the point where voltage is measured. Typically, the value of voltage in a bus bar will be greatest at the location where an electrical connection to the power source attaches and least at the distal point of the bus bar. In various embodiments, a bus bar will have lower electrical resistance at an end proximal to the connection to the electrical source and a higher resistance at a distal end (i.e. the resistance is higher at the distal end than at the proximal end).

Each of the lengthwise variable bus bars may have linearly, stepped, or otherwise varying geometry and/or material composition along its length. For example, a bus bar with lengthwise-varying geometry may have its width, height, and/or other cross-sectional dimension linearly tapering from the proximal end to the distal end. As another example, a bus bar may be comprised of multiple segments with stepwise decreasing widths or other dimensions from the proximal end to the distal end. In yet another example, a bus bar may have a material composition that varies lengthwise to increase electrical resistivity between proximal and distal ends.

FIGS. 4D and 4E depict EC lites, 425 and 435 respectively, each having a monolithic EC device on a transparent substrate and a pair of bus bars. The width of each of the bus bars varies along its length. This geometric lengthwise variation in the bus bars may produce a tint gradient zone (gradient in lengthwise direction) on the monolithic EC device when energized.

FIG. 4D depicts an EC lite, 425, including bus bars 430. Each of the bus bars 430 has a varying width along its length that linearly tapers lengthwise. In certain embodiments, the variation in width between the two ends may be between about 10% and about 100% from the average width over the length of the bus bar. In one embodiment, the variation in width may be between about 10% and about 80% from the average width over the length of the bus bar. In another embodiment, the variation in width may be between about 25% and about 75% from the average width over the length of the bus bar. In this example, not drawn to scale, the bus bars 430 are widest at the top of EC lite 425 and linearly taper lengthwise to their thinnest width near the bottom of lite 425. Because of the varying width, bus bars 430, when energized, establish a voltage gradient. For example, when energized, bus bars 430 have their highest effective voltage at the top, and their lowest voltage at their bottom portion; a voltage gradient is established along the bus bars. As depicted in the right portion of FIG. 4D, a corresponding tinting gradient is established by virtue of the voltage gradient. Thus a tint gradient zone is established. Bus bars of varying width can be used in one or more zones of an EC lite having two or more zones as described herein. In this illustrated example, a single tint gradient zone is established across an EC lite. Although a linearly tapered width is illustrated in FIG. 4D, a non-linearly tapered width can be used in other cases.

In certain embodiments, the tapering of the bus bars need not be a smooth taper. For example, a bus bar may have a stepped down width along its length (i.e. stepwise width variation along its length). FIG. 4E depicts an EC lite, 435, having a monolithic EC device and bus bars that have stepped widths along their lengths. Each bus bar has three segments with stepped down widths along its length. Each bus bar has a first width that spans a first portion, 440, of the length of the bus bar. Adjacent to the first portion, is a second portion, 445, of the length of each bus bar. The second portion has a second width shorter than the first width. Finally, adjacent to the second portion and having a third width, is a third portion, 450 of each bus bar. The net tinting gradient effect may be the same as or similar to the smooth linearly taper bus bars described in relation to FIG. 4D. One of ordinary skill in the art would appreciate that varying the width of the bus bars can be done in other patterns, such as thicker in the middle than at the ends, etc. without escaping the scope of embodiments described herein, that is for an EC lite having bus bars of varying widths configured to create one or more tint gradient zones, and corresponding tinting effects, on a monolithic EC device.

Electrically Resistive Bus bars

In certain embodiments, a bus bar with uniform cross-section and electrical conductivity characteristics is used to create the required electrical gradient from one end of the bus bar to the other end. This is achieved by taking advantage of voltage drop along a bus bar. That is, a bus bar of sufficient resistivity, e.g. a sufficiently thin bus bar of highly conductive material or a bus bar made of more resistive, though still conductive material, such that there is a voltage drop along the bus bar's length when voltage is applied to one end. It can be shown that:

$\Delta V_L = (R_B * J * W_0 * L)^2/2$ where:

$\Delta V_L$ is voltage drop along Bus bar at a distance L from point of application of power $R_B$ is the resistance per unit length of the Bus bar J is the leakage current density of the EC window $W_0$ is the width of the EC window Thus, for a window where the bus bar is powered at one end only, if:

$RB > (\Delta V/L_0) * (2/I_{EC})$ where:

$\Delta V$ is the required voltage drop along the bus bar $I_{EC}$ is the net current draw for the EC device $L_0$ is the length of the EC window Then the electrically resistive bus bar will act as a resistance path in the circuit and be able to provide adequate drop in voltage along its length. Since the Transmission of the EC window is proportional to the V_eff, and the drop in the voltage along the Bus bar ($\Delta V$) reduces the V_eff as described previously, the ($\Delta V/L_0$) terms represents the gradient of the shading/Tvis from one end to the other, e.g. a small part (small $L_0$) with a large voltage drop along the bus bar from end to the other will have a very pronounced Tvis shading/gradient, while for a large part will need a larger voltage drop along the bus bar to maintain the same shading along its length. Thus, the bus bar properties, e.g. height, width, material, though having a uniform cross section, can be selected during fabrication to provide the required shading from one end to the other. This enables ease of design/manufacturing to avoid complex-geometry bus bars, while still providing a gradient in the optical properties across the window. For example, one can fabricate a thin bus bar that has a voltage drop across its length to create a gradient shading.

Dual Powered Bus bar

Figure 4G:
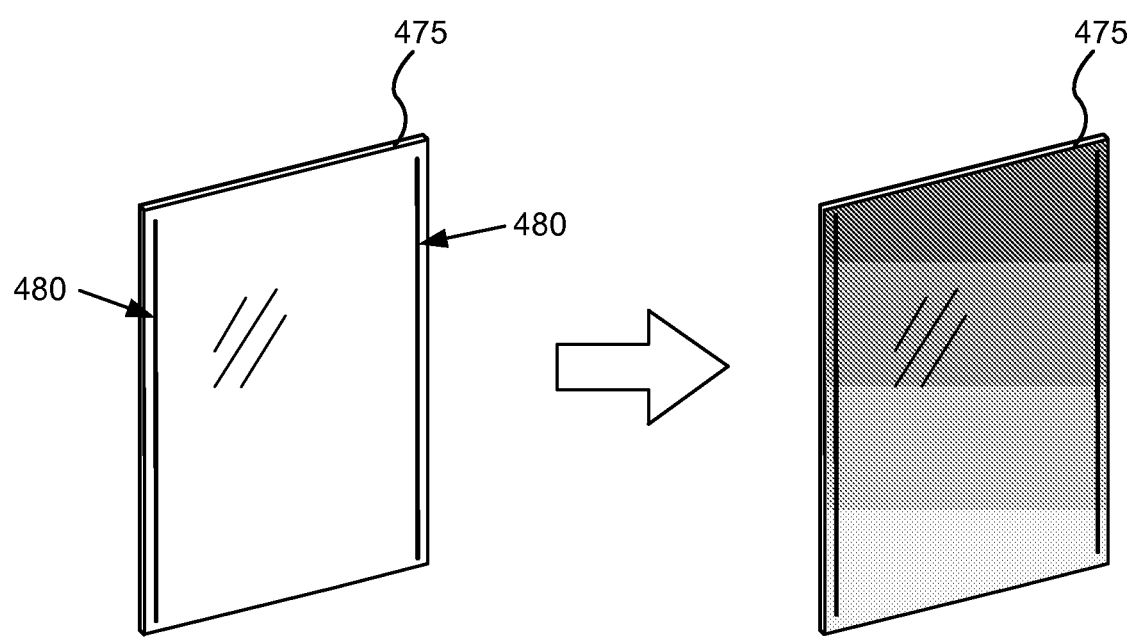
Figure 4H:
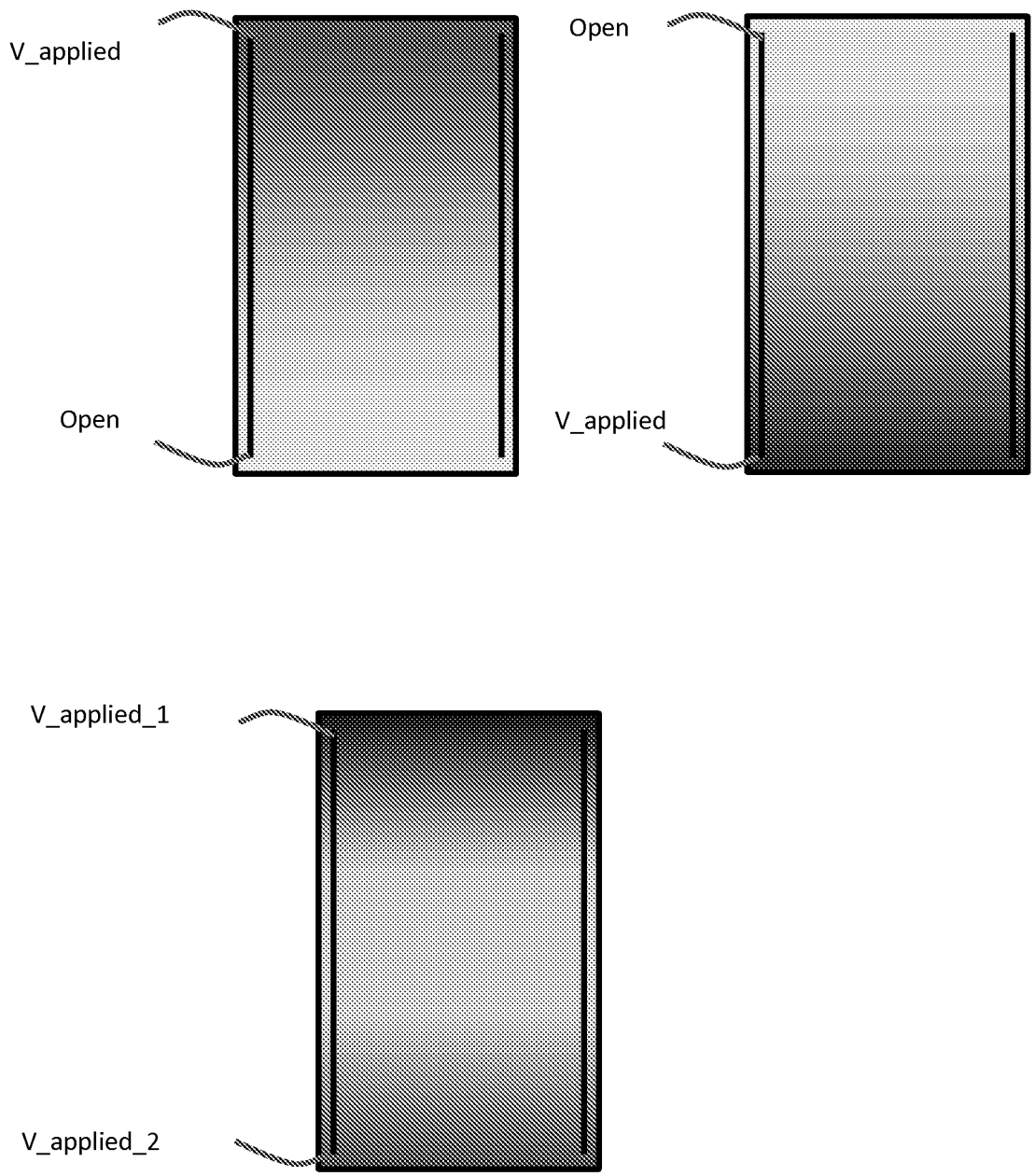

In certain embodiments described above, the bus bars, particularly those in the "electrically resistive bus bar" embodiments described in relation to FIG. 4G, can be powered from one end of the bus bars (as described above) or both ends of each bus bar (as described in relation to FIG. 4H). Powering bus bars from both ends provides additional control over the gradients/shading of the EC window. For example, as depicted in FIG. 4H (top left), a voltage is applied to the top ends of the two bus bars that power each of the TCO's of the EC device coating. The bottom ends are also in electrical communication through leads (depicted here as "open"). A voltage gradient is established over the length of the bus bars, in this example substantially equal gradients across the bus bars of substantially the same length. This results in a voltage gradient across the TCO's and a corresponding tinting gradient across the monolithic EC device coating. By using a dual lead configuration, one can "flip" the tinting gradient (see FIG. 4H, top right) by applying voltage at the bottom of the bus bars and establishing the opposite tinting gradient (depicted vertically here).

Referring again to FIG. 4H, bottom, one of ordinary skill in the art can see that multiple combinations are possible by suitable selections of V_applied_1, V_applied_2 and bus bar pattern and $R_B$. In this example, the top and bottom portions of the EC device are tinted darker than a middle portion, when V_applied_1 and V_applied_2 are applied to both ends of both bus bars (only one bus bar's application depicted).

In one embodiment, an IGU includes two EC lites, each EC lite having a tint gradient zone as described in relation to FIGS. 4D and 4E. In one embodiment, the tint gradient zone of each EC lite is configured in opposition to each other, that is, one EC lite has a tinting front that starts at the opposite side (e.g., edge) of where the tinting front of the other EC lite starts. In this embodiment, a unique curtaining effect is established where the tinting fronts approach each other from opposite sides and cross paths in the middle of the IGU. In one case, when transition is complete in both EC lites, the IGU may have a "privacy glass" tint level, of e.g. <1% T. In another embodiment, each EC lite may be tinted independently to provide a "top down" tint gradient or "bottom up" tint gradient. In one embodiment, the tint gradient zones of the EC lites are registered together i.e. aligned so that the tinting fronts of the EC lites start on the same side of the IGU and end at the other opposing side. In this latter embodiment, tinting of the IGU may be done for different tint levels with one lite, e.g., to provide a top down tint gradient of one intensity (absorption gradient e.g.) for one tint level, and another (darker) tint level of tinting gradient when both lites are tinted. Either of the two aforementioned IGU embodiments may have their individual EC lites tinted together or alternatively tinted asynchronously for yet another shading effect that is not possible with conventional monolithic EC devices.

In one embodiment, a bus bar may include an inner portion of electrically conductive material with a cross-sectional dimension (e.g., width) that varies lengthwise, and an outer portion of electrically resistive material. The outer portion may have geometry which is designed to couple and form with the inner portion a uniform cross-section along the length of the bus bar.

In certain embodiments, such as some embodiments described above, an electrochromic window lite includes a monolithic EC device on a transparent substrate, wherein the EC lite includes at least one pair of bus bars configured to produce a tint gradient zone on the monolithic EC device when energized. In some embodiments, tinting gradients are established using bus bars, where each bus bar has at least two portions that are highly conductive. The at least two portions are separated by a portion that is more resistive than the highly conductive at least two portions, while still being electrically conductive. The more resistive portion is configured adjacent to or overlapping the at least two highly conductive portions. In this embodiment, the at least two highly conductive portions are separated, they do not touch, but rather each only touches, and is in electrical communication with the more resistive portion in between them. An electrical power source is configured to power only one portion of the at least two highly conductive portions of each of the at least one pair of bus bars. Each of the only one portion of the at least two highly conductive portions is proximate the same side of the monolithic EC device as the other of the only one portion. One of these embodiments is described in more detail in relation to FIG. 4F.

Tint gradient zones can be created using bus bars having varying material composition along their lengths. For example, FIG. 4F depicts an EC lite, 455, having two bus bars, each configured along opposing edges (e.g., vertically, horizontally, etc.) and parallel to each other on lite 455. In this example, each bus bar has highly electrically conductive portions, 460a, 460b, and 460c (collectively, 460), and less electrically conductive portions, 465a and 465b (collectively, 465). In the illustrated example, less electrically conductive portions, 465a is between highly electrically conductive portions 460a and 460b, and less electrically conductive portions, 465b is between highly electrically conductive portions 460b and 460c. The less electrically conductive portions, 465a and 465b, may be portions of a monolithic bus bar where the conductivity has been reduced by, e.g. changing the morphology of the bus bar material and/or perforating the material, etc. In another example, separate bus bars are used, for example as described in relation to FIGS. 4A and 4B, and the TCO on which it lies, specifically the area of the TCO between ends of bus bars, acts as a resistive element to slow current flow between proximate bus bar ends. Referring again to the specific example in FIG. 4F, highly electrically conductive portions 460a, 460b, and 460c may be conventional silver based conductive bus bar ink, while portions 465a and 465b may be a less conductive ink. In this illustrated example, the bus bars may be connected to an electrical source at the top portion, 460a, of each bus bar. A voltage gradient may be established along the length of the bus bars by virtue of the resistive portions 465a and 465b. That is, the top highly conductive portions 460a may have the highest voltage, and the middle highly conductive portions 460b may have a somewhat lower voltage because the more resistive portions 465a creates an IR voltage drop between the middle portions 460b and portions 460a. Likewise the bottom-most highly conductive portions 460c may have the lowest voltage because the more resistive portions 465b lie between them and the middle highly conductive portions 460b preventing some of the electrical current from flowing from middle portion 460b to lower portion 460c. The net effect may be a tint gradient zone, for example, the one depicted in FIG. 4F. Highly electrically conductive portions 460 may be of the same or different conductive material, and likewise, less electrically conductive portions 465 may be comprised of the same or different conductive material. The key is that portions 465 are less electrically conductive than their adjacent neighbors 460. Using this technology, a wide variety of voltage and/or resistance patterns may be established in order to create corresponding tint gradient zones in an EC lite. In addition, a combination of bus bars of lengthwise varying width and those bus bars configured as described in relation to FIG. 4F may be used. For example, each as partners in a bus bar pair and/or in individual tint gradient zones on an EC lite.

Remotely Controlled Resistive Nodes

In certain embodiments, the less electrically conductive portions, 465 have variable resistance whose resistance can be varied between 1 mOhm-1 kOhm to dynamically adjust the tint gradient zones, i.e. when no zoning is required, elements 465 are in the low resistance state. That is the bus bar segments 460 and 465, collectively, act as a single bus bar of low resistitivity. When zoning is desired, elements 465 are switched to a higher resistance state (than bus bar segments 460) when zoning is desired. The resistance of the element can also be varied to modulate the gradient in the Tvis (lower resistance for lower gradient). The element 465 can be an electronic control element that can modulated remotely (e.g. wireless/Bluetooth/Zigbee etc.) and can be triggered by automated EC control intelligence and/or manually by user input. The control element may be a component of an onboard controller, that is, an EC controller that is integrated with, in, part of the IGU. Such onboard controllers are described in U.S. patent application Ser. No. 13/049,750 titled "ONBOARD CONTROLLER FOR MULTISTATE WINDOWS," filed on Mar. 16, 2011 and in U.S. patent application Ser. No. 14/951,410 titled "SELF-CONTAINED EC IGU," filed on Nov. 24, 2015, both of which are hereby incorporated by reference in their entirety.

Different Bus Bar Types on each TCO of an EC Device.

In certain embodiments, the top and bottom TCO bus bar configurations may be different, which can be used synergistically to provide even more control over the zoning/gradients. For example, consider a specific cross section (orthogonal to the bus bars) of a monolithic EC device coating having bus bars of different configuration along each side. If the voltage profile, gradient, along one bus bar is different than the voltage profile of the other bus bar, then various tint gradients can be achieved. Thus, with different combinations of bus bar configurations on a single EC coating, almost endless variations in the gradients are possible.

Low Leakage Current Requirements

The EC device tinting or clearing operation can be divided into a drive step and hold step, e.g. where there is a ramp in voltage followed by a constant voltage, respectively. For monolithic EC device coatings without physical breaks/scribes/resistance zones, but having tint zones as described herein, it is especially important that the leakage current of the device is as low as possible. This is because, the leakage current can normalize or diffuse out any gradients setup due to conduction over the TCOs and change in the V_applied. Thus, leakage currents <5 µA/cm$^2$ are desirable to 'freeze' the gradients setup in the window. Such low leakage current EC coatings are described, e.g., in US Patent.

Advantages of no break in EC stack; Smooth gradients vs. Sharp transition

With respect to user aesthetics for gradient tinting EC windows, it is preferable not to have any sharp transitions in Tvis, but rather a gradual shading from one end to the other.

In certain embodiments, an EC lite may be configured to have a combination of tint gradient zones and tint zones that do not have tint gradient capability (non-gradient tint zones). One embodiment is a monolithic EC device having two or more tinting zones, where at least one tinting zone is a tint gradient zone and at least one tinting zone is a non-gradient tint zone. One embodiment is a monolithic EC device having two or more tint gradient zones, with or without also having a non-gradient tint zone.

In one embodiment, the bus bars described in relation to FIG. 4F are configured such that each highly electrically conductive portion, 460a, 460b, and 460c, has its own electrical connection to a power source. Analogous to the separate bus bar pairs described in relation to FIG. 4A (or FIG. 3A or 3D), the bus bars described in relation to FIG. 4F, when configured with each highly electrically conductive portion 460 having its own power source (or sources, e.g. as described in relation to FIG. 4H), may be used to create tint gradient zones with tinting patterns similar to those described in relation to FIGS. 4B and 4C.

In certain embodiments that use powering mechanisms alone to create tinting zones, the tinting front may not be a clean line, but rather have a diffuse appearance along the tinting front due to the charge bleeding off into the EC device's adjacent zone which is not powered at the time. In certain embodiments, resistive zones may be used to aid in maintaining more well-defined tinting fronts. Resistive zones are described in more detail below.

Resistive Zones with or without Configuring Powering Mechanism of EC Devices

Figure 5A:
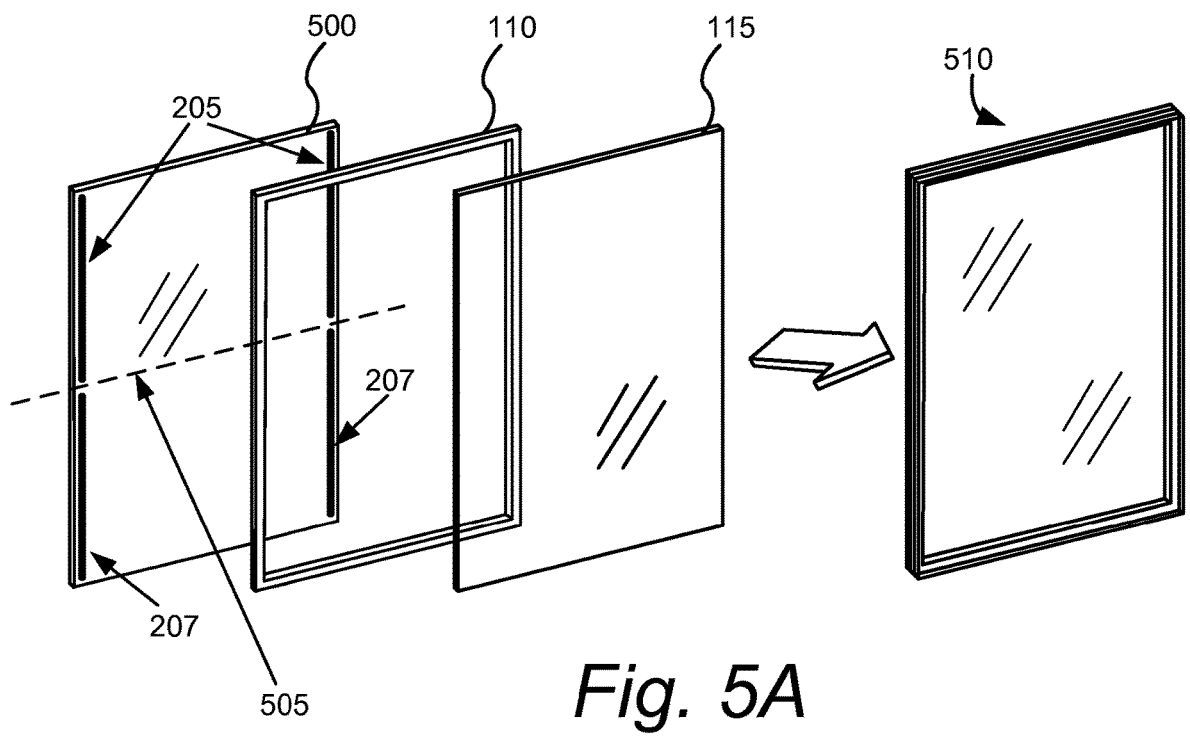
FIGS. 5A and 5B depict fabrication of an IGU with an EC lite and associated tinting schemes, respectively.

In certain embodiments, resistive zones are configured in the monolithic EC device. These resistive zones may allow for more uniform tinting fronts, e.g., when used in combination with bus bar powering mechanisms described herein. Referring to FIG. 5A, an EC lite, 500, much like EC lite 200 of FIG. 2A, is configured with two pairs of bus bars for creating two tinting zones, in this example (as depicted) a top and a bottom zone. EC lite 500 may be incorporated into an IGU, 510, with a spacer 110 and a mate lite 115 as depicted. A major difference between lite 200 of FIG. 2A and lite 500 of FIG. 5A is that lite 500 does not have a laser scribe 225 across the lite to bifurcate the EC device into two devices. Lite 500 has a single EC device over the viewable area of the lite. However, the EC device on lite 500 includes a resistive zone, 505, that spans the width of the EC device. The heavy dotted line in FIG. 5A indicates the approximate position of resistive zone 505.

As depicted in the IGU construct 510, resistive zone 505, like laser scribe 225, may not be visible to the naked eye when the EC lite's zones are not tinted. However, unlike laser scribe 225, when adjacent tinting zones of EC lite are tinted, resistive zone 505 may not be visually discernible to the naked eye. This is illustrated schematically in the right portion of FIG. 5B. The reason resistive zone 505 tints is because it is not a physical bifurcation of the EC device into two devices, but rather a physical modification of the single EC device coating and/or its associated transparent conductors within a resistive zone. The resistive zone is an area of the EC device where the activity of the device is impeded, specifically through higher electrical resistivity and/or greater resistance to ion movement and/or lower ion density compared to the remainder of the EC device. Thus one or both of the transparent conductors may be modified to have increased electrical resistivity in the resistive zone, and/or the EC device stack may be modified so that ion movement is slower in the resistive zone relative to the EC device stack in the adjacent tinting zones. The modifications may be made during deposition of the EC device or post deposition through a thermal and/or laser treatment. The EC device still functions, tints and bleaches, in this resistive zone, but at a slower rate and/or with less intensity of tint than the remaining portions of the EC device. For example, the resistive zone may tint as fully as the remainder of EC device in the adjacent tinting zones, but the resistive zone tints more slowly than the adjacent tinting zones. In another example, the resistive zone may tint less fully than the adjacent tinting zones, and at a slower rate.

Figure 5B:
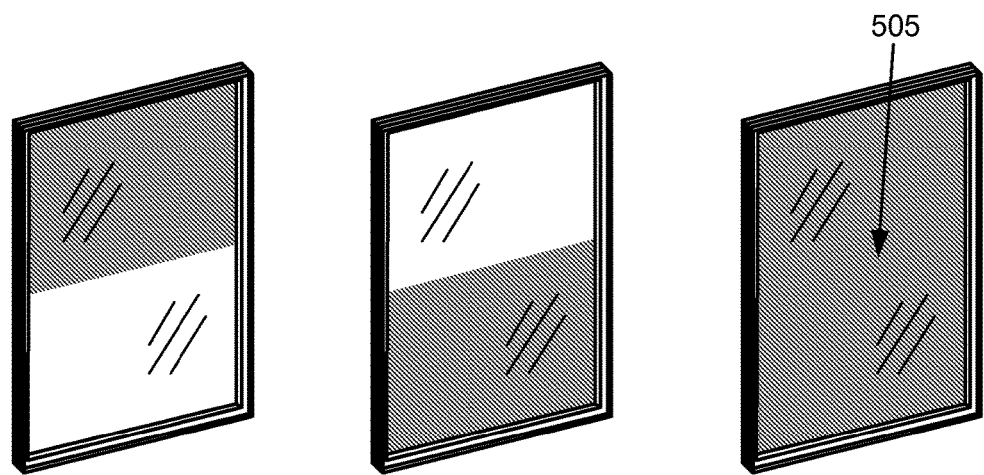
Figure 5C:
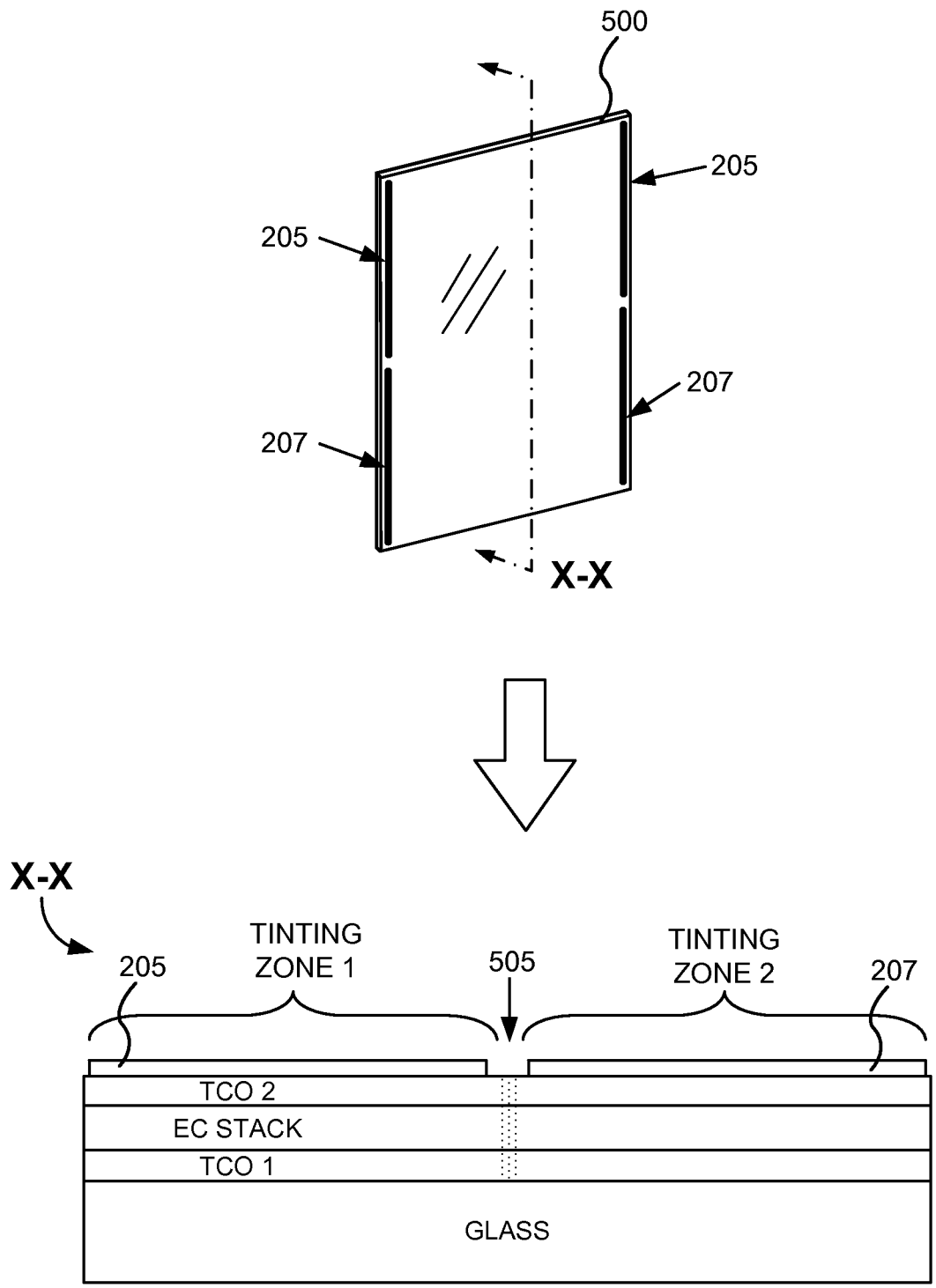
FIG. 5C depicts a perspective and a cross section of an EC device having two tinting zones separated by a resistive zone.

FIG. 5C is a perspective and a cross section, X-X, of EC lite 500 as described with respect to FIGS. 5A and 5B. The cross section, X-X, spans the upper and lower tinting zones (tinting zones 1 and 2, respectively) of EC lite 500 as well as resistive zone 505 (only the bus bars on the top TCO are depicted in cross section X-X, they are orthogonal to resistive zone 505 in this example). Cross section X-X (lower portion of FIG. 5C) is not to scale, but rather a schematic representation of the structure of EC lite 500. On the glass substrate is an EC device including a first transparent conducting oxide layer, TCO 1, a second transparent conductive oxide layer, TCO 2, and sandwiched in between the TCOs is an EC stack which contains one or more electrochromic materials, e.g., the transitions of which are driven by intercalation/de-intercalation of ions, such as lithium ions. Resistive zone 505 is an area in the EC device where one or more layers of the EC device have their function impaired, either partially or completely, but device function is not cut off across the zone. For example, one or both of the TCOs has a higher resistance to electrical flow in resistive zone 505 than in the tinting zones. Thus, e.g., if tinting zone 1 is activated, electrons flow across the TCOs at a given rate, but that flow is restricted along resistive zone 505. This allows the electrons to be sufficiently retained in tinting zone 1 and thus leak more slowly across resistive zone 505 than otherwise would be the case if TCO function had not been impaired there.

Resistive zone 505 could be thought of as a "dam" for electrical and/or ionic flow, impairing rate of flow (either ionic current or electronic current) across it, the flow can be partially or fully impaired in one or both TCOs, for example. Due to the restricted or slowed rate of electrical flow across resistive zone 505, ion intercalation in the EC stack between the TCOs at resistive zone 505 is also impaired. Because the EC device is not physically cut into two devices, this is unlike conventional devices having zones created by physical bifurcation of one more layers of a single device coating. Resistive zone 505 may have physical impairment of ion flow in one or more of the EC material layers. In one example, both the top and bottom TCO's electrical conductivity is impaired, either partially or fully, in resistive zone 505, but the function of the EC device stack layers is substantially unchanged. Thus, when one tinting zone is tinted and the adjacent zone is not-tinted, the device will tint under resistive zone 505. When adjacent tinting zones are both tinted, there is no bright line discernible to the end user, because the device tints under resistive zone 505. In embodiments where ion flow is impaired in resistive zone 505, the device may still color, but more slowly than the bulk device. This rate difference in coloring may or may not be visually discernible to the end user.

Resistive zone 505 may be fabricated, for example, by exposure of the area at the resistive zone 505 to irradiation, e.g. laser or heat source, in order to modify but not destroy the function at resistive zone 505. For example, one or both of the TCO layers may be heated sufficiently to change the morphology while retaining the function, albeit impaired relative to the remainder of the TCO layers in the tinting zones. In certain embodiments, it is advantageous to impair the function of only one TCO in a resistive zone. Resistive zones may also be created by impairing the function of one or more layers of the EC device (including, or not, one or both TCOs) by chemical doping. For example, in one embodiment the lower TCO is treated along a line (at resistive zone 505, e.g.) with heat and oxygen to create a more resistive TCO at the resistive zone. In another embodiment, one or both TCOs are fabricated thinner along the resistive zone than the rest of the TCOs, e.g. TCO material may be removed, but not cut through, along the resistive zone. In another example heating along the zone may densify the EC materials while having no effect on the TCO layers; or may affect the TCO layers as well.

In certain embodiments, the resistive zones may be narrow, e.g. between about 1 µm and 1000 µm wide, or may be wider, e.g. between about 1 mm and about 10 mm wide. Because the EC materials in resistive zones tint and do not necessarily leave a bright line contrast effect typical of conventional laser isolation scribes, there is less concern as to the width of the described resistive zones. Thus, in other embodiments, a resistive zone may be, for example, wider than 1 mm, wider than 10 mm, wider than 15 mm, etc.

In the embodiment described in relation to FIGS. 5A, 5B, and 5C, each of the tinting zones has its own unique pair of bus bars. Thus tinting zones can be colored independently by virtue of operation or the respective bus bar pairs at each tinting zone. In other embodiments, multiple tinting zones may be configured to share a common bus bar, while still being independently controllable.

Figure 5D:
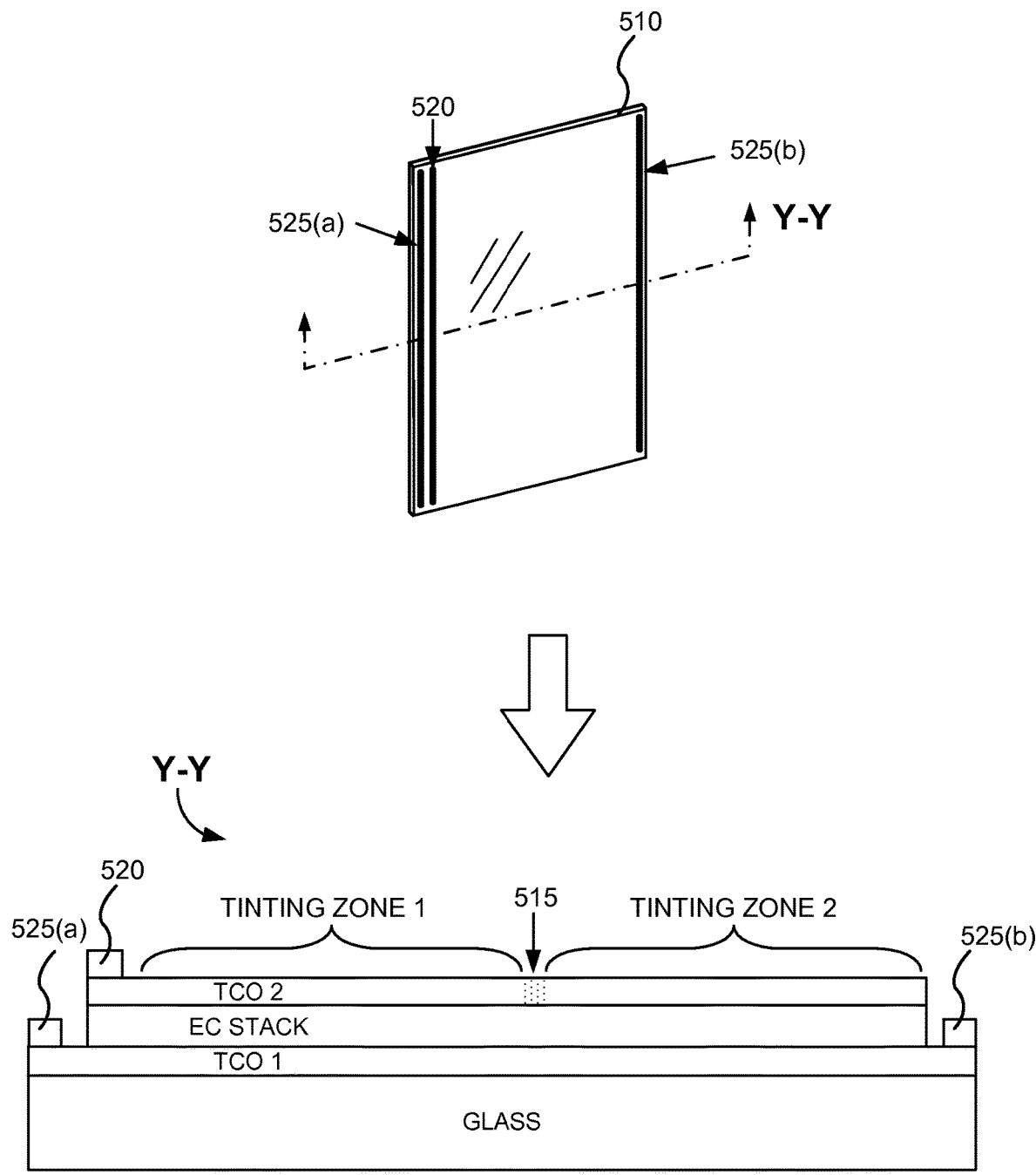
FIG. 5D depicts a perspective and a cross section of an EC device having two tinting zones by virtue of a resistive zone.

FIG. 5D depicts a perspective (top portion) and a cross section Y-Y (bottom portion) of an EC lite, 510, having two tinting zones of variable tinting level by virtue of a resistive zone, 515. In this illustrated example, a single set of three bus bars, 525(a), 525(b), and 520, is used with two tinting zones. Cross section, Y-Y, of EC lite 510 spans left and right tinting zones (tinting zones 1 and 2, respectively) of lite 510 as well as resistive zone 515. Resistive zone 515 runs parallel to and between (approximately in the middle of EC lite 510) bus bars 520 and 525(a) and bus bar 525(b) (from top to bottom as depicted in the perspective at the top of FIG. 5D). Cross section Y-Y (lower portion of FIG. 5D) is not to scale, but rather is a schematic representation of the structure of EC lite 510. On the glass substrate is an EC device including a first transparent conducting oxide layer, TCO 1, a second transparent conductive oxide layer, TCO 2, and sandwiched in between TCO 1 and TCO 2 is an EC stack which contains one or more electrochromic materials, e.g., the transitions of which are driven by intercalation/de-intercalation of ions, such as lithium ions. In this example, resistive zone 515 is an area of TCO 2, where the TCO function is impaired but not eliminated. For example, TCO 2 may have its function impaired along a line.

Figure 5E:
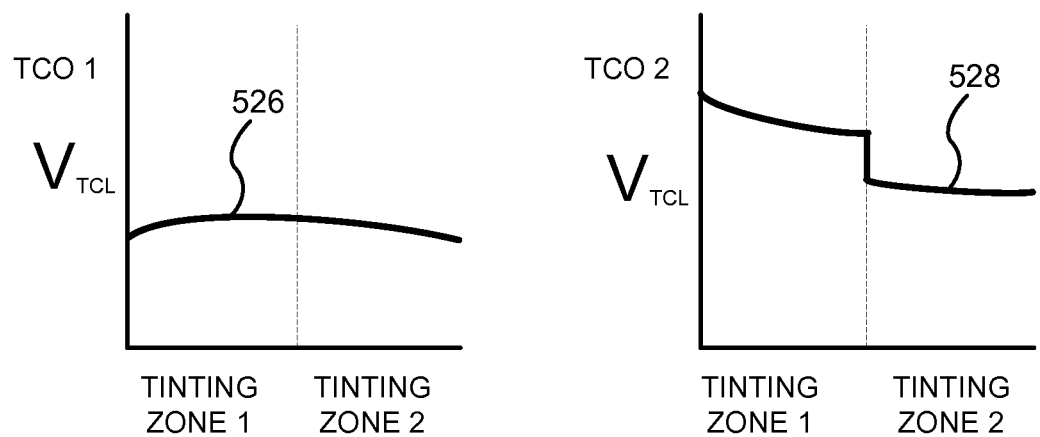
FIG. 5E shows graphs of $V_{TCL}$ for two transparent conducting oxide layers of an EC device configured with a resistive zone created by inhibiting the electrical conductivity of only one of the transparent conducting oxide layers.
Figure 5F:
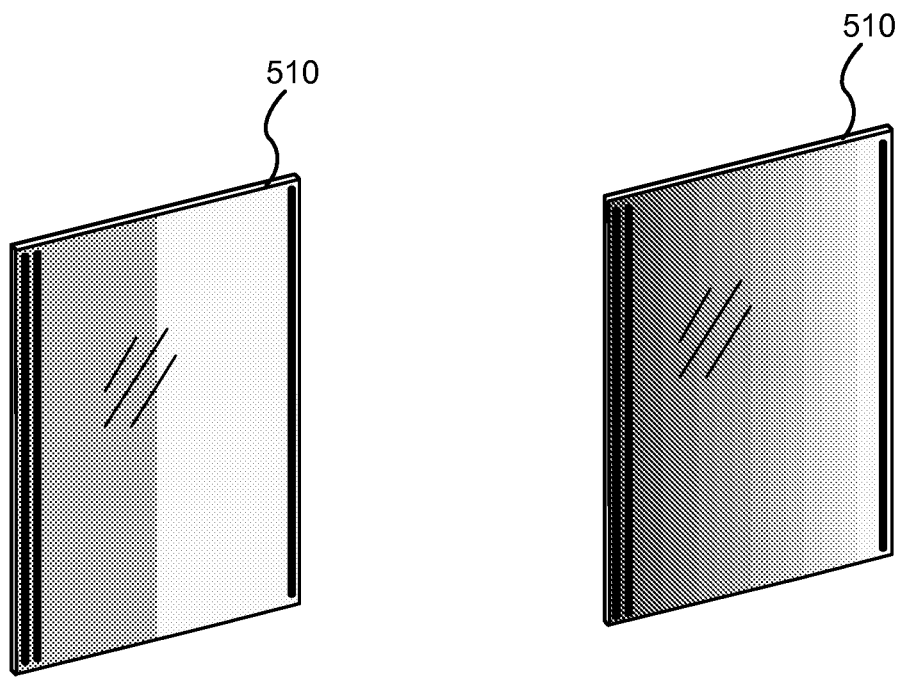
FIG. 5F depicts a tinting pattern of the EC lite described in relation to FIG. 5C.

FIG. 5E includes two graphs showing plots of the local voltage $V_{TCL}$ in TCO 1 and TCO 2 of the EC lite, 510, of FIG. 5D that drives transition. At the left, a graph shows a curve 526 of the local values of $V_{TCL}$ in the TCO 1. At the right, a graph shows a curve 528 of the local values of $V_{TCL}$ in the TCO 2. In this example, when the EC device is energized, the bottom TCO 1 has a local voltage potential $V_{TCL}$ across its span similar to that of a typical transparent conductor for an EC device. According to curve 526 of $V_{TCL}$ in TCO 1, the voltage increases slightly in the middle away from where bus bars 525(a) and 525(b) are disposed on TCO 1 where voltage is applied due to the sheet resistance and current passing through TCO 1. The increase will be near bus bar 525(a) and bus bar 520 because of the higher current in this area due to higher voltage potential between bus bar 525(a) and bus bar 520. But TCO 2, by virtue of resistive zone 515, has a higher $V_{TCL}$ in tinting zone 1 than in tinting zone 2. According to curve 528 $V_{TCL}$ in TCO 2, the slight voltage drops between the left hand side where bus bar 520 is disposed on TCO 2 and the resistive zone due to sheet resistance and current passing through TCO 2. At the resistive zone 515, the voltage sharply drops. The voltage slightly drops between the resistive zone 515 and the right hand side due to sheet resistance and current passing through TCO 2. The value of $V_{eff}$ at any location between the bus bars is the difference in values of curves 130 and 125 at that position on the x-axis corresponding to the location of interest. The result is that tinting zone 1 has a higher $V_{eff}$ than tinting zone 2 and thus tinting zone 1 colors more darkly than tinting zone 2. This is represented in FIG. 5F. On the left of FIG. 5F, a visible coloration difference is seen in window 510 corresponding to the location of resistive zone 515 and the rather abrupt drop in voltage in TCO 2 as reflected in FIG. 5E. However, this visual coloration difference need not be so; that is, for example, if resistive zone 515 is sufficiently "leaky", and allows voltage to flow across the top TCO in a smooth gradient (or if window 510 is configured without resistive zone 515 and the voltage applied to TCO 2 is insufficient to overcome a voltage drop across TCO 2) then a gradual transition from darker to lighter results (see FIG. 4F, right side) due to the voltage drop over. Of course, the two tinting zones can be configured as upper and lower portions when installed in a building, and they need not be side by side as depicted.

Figure 5G:
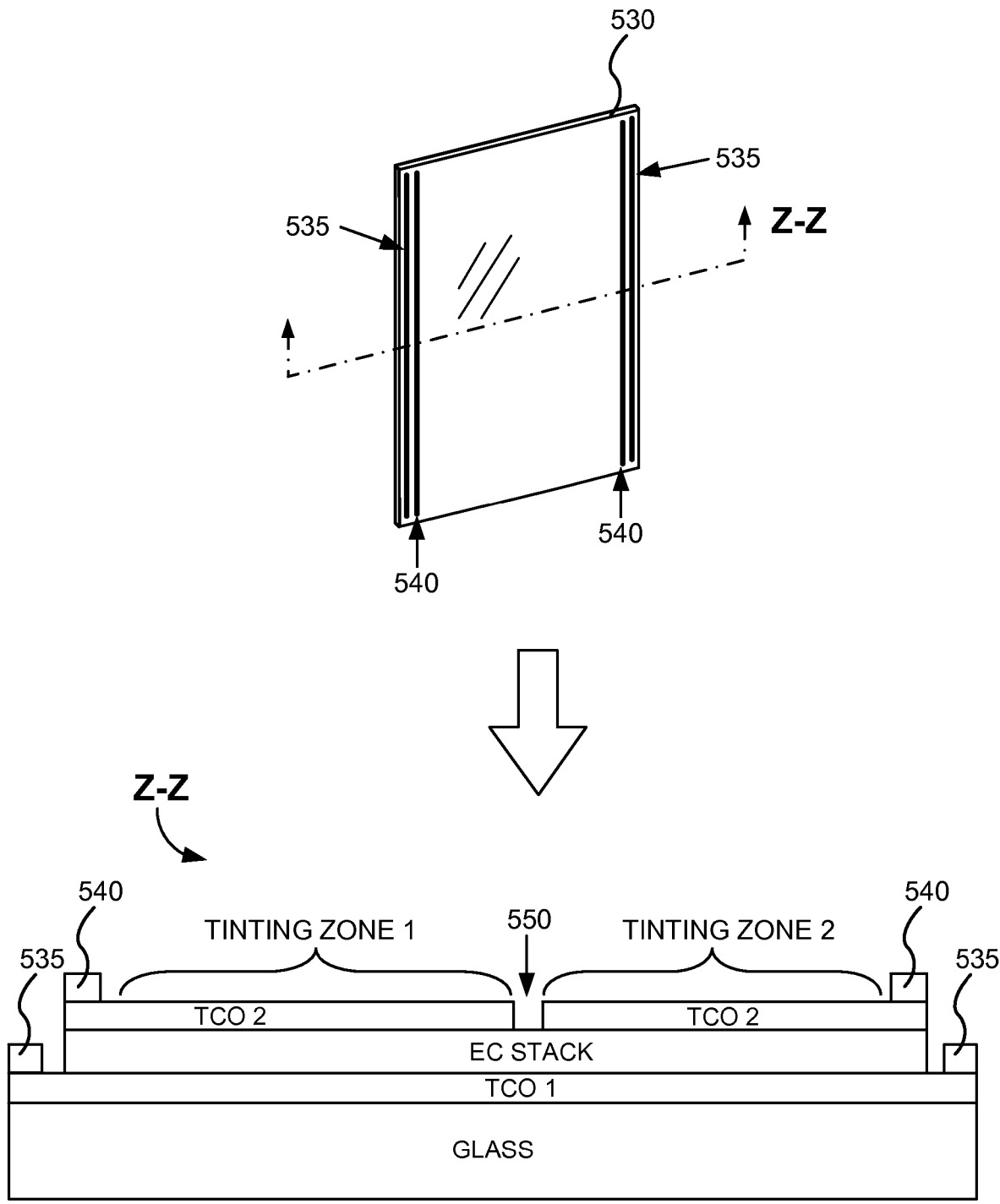
FIGS. 5G to 5K depict EC devices configured with a resistive zone created by inhibiting the electrical conductivity of only one of the transparent conducting oxides.

FIG. 5G depicts an EC lite, 530, configured with a resistive zone created by inhibiting the electrical conductivity of only one of the transparent conducting oxides. The EC lite is much like the one described in relation to FIG. 5E, but in this embodiment one of the TCOs is cut through along the resistive zone (cut 550), while the other TCO is left intact. The EC device stack is unchanged in the resistive zone, only the top TCO is cut. The EC lite 530 has two sets of bus bars, 535 and 540. Bus bar set 535 powers the lower TCO 1, while bus bar set 540 powers the top TCO 2. The lower portion of FIG. 5G shows cross section Z-Z. The EC device will still at least partially color along the resistive zone by virtue of one of the TCOs being fully intact, monolithic, along with the EC stack. While there is a narrow region of the opposite TCO 2 missing, there is sufficient voltage potential established between the intact TCO 1 and the edge of the cut (opposing) TCO 2 along the resistive zone to allow coloration of the EC device in the resistive zone, albeit more slowly than if both TCOs were intact along the resistive zone. The resistive zone may color more lightly when only one of the tinting zones is powered, while with both tinting zones powered, the resistive zone may fully tint or approximate full tinting. Each portion of TCO 2 can be powered independently of TCO 1. In this way, separate zones, tinting zone 1 and tinting zone 2, may, e.g., be tinted more effectively. Since there is a cut through the TCO 2, if only one zone is powered, a tinting level of $V_{TCL}$ is only established in that tinting zone. The cut in TCO 2 aids in establishing and maintaining a uniform tinting front. In this example, since the TCOs are a type of moisture barrier, EC lite 530 may be incorporated into an IGU where the EC device is hermetically sealed within the volume of the IGU, and/or a top coat may be used to hermetically seal the device, with our without lamination to a substrate. A top coat would fill the open trench cut through TCO 2.

Figure 5H:
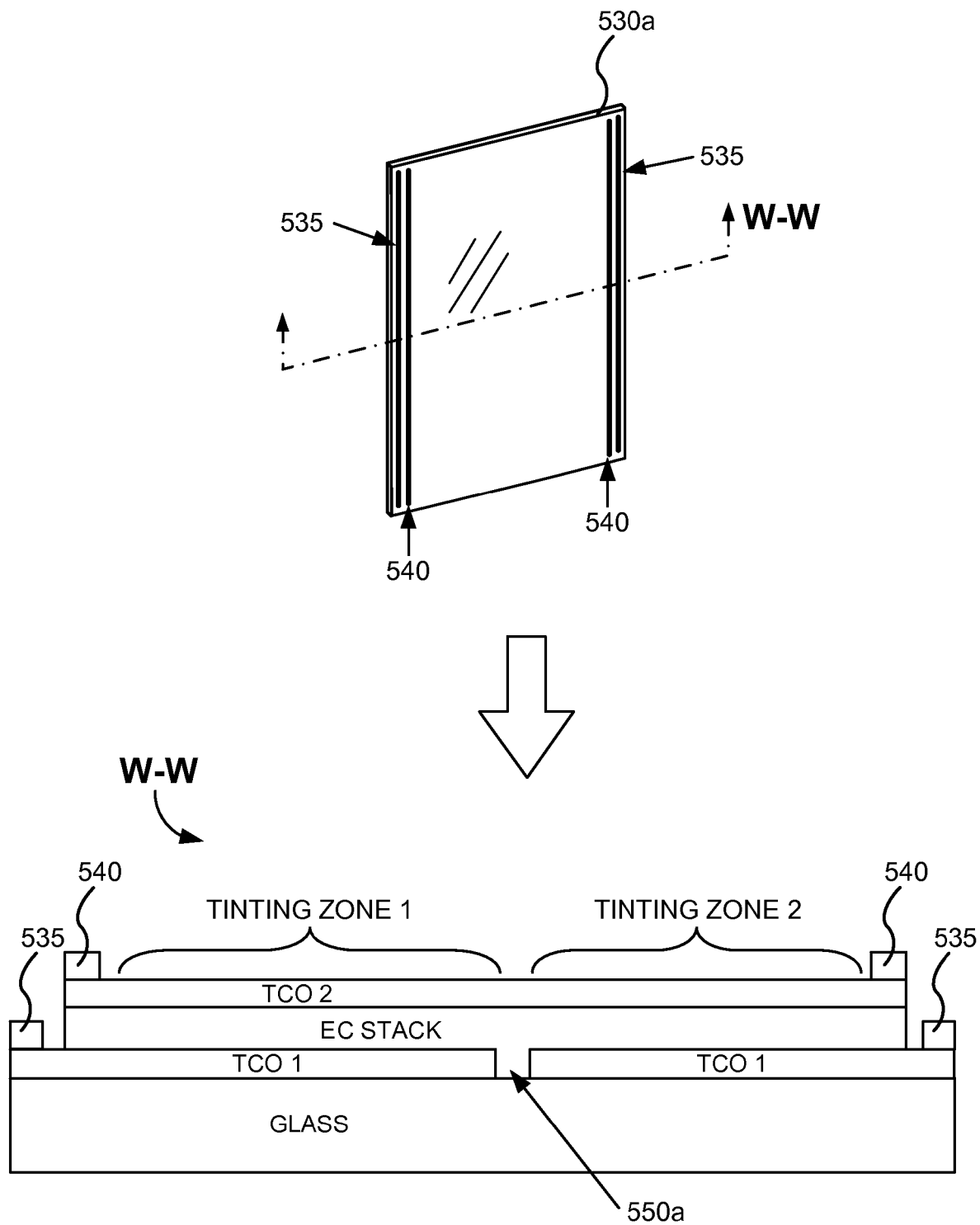

In certain embodiments, it may be more desirable to cut the bottom TCO 1 rather than the top TCO 2. FIG. 5H shows EC lite, 530a, where the cut, 550a, is made only through the bottom TCO 1. In this example, the top TCO 2 may maintain its hermeticity by virtue of an intact top transparent conductor layer. The EC material may fill in the trench made by cut 550*a*, and thus tint along with the trench in TCO 1 that it fills, providing an area of inhibited coloration rate such as a resistive zone.

In certain embodiments, it may more desirable to cut the top TCO 2 rather than the bottom TCO 1. FIG. 5G shows EC lite, 530, where the cut, 550, is made only through the top TCO 2. An advantage of this embodiment may be that the cut can be made after the EC device is fabricated, for example, by laser processing performed after sputter coating.

The bus bars 535 and 540 depicted in FIGS. 5G and 5H need not be parallel, e.g. the bus bars powering each TCO can be orthogonal to each other. Also, the single monolithic TCO need not have two bus bars, but it is desirable so as to have more control over tinting of the individual tinting zones. Bleaching function would work the same way but in reverse polarity to bleach the tinting zones. In the embodiments described in relation to FIGS. 5D-5H, the bus bars are configured parallel to the resistive zone; in FIGS. 5I and 5J, like in FIG. 5C, e.g., the bus bars are configured orthogonally to the resistive zone.

In certain embodiments, there are no bus bars in the viewable area of the EC device, that is, in the area within the spacer of the IGU. Certain conventional EC technologies rely on bus bars running through the viewable area because of slow switching kinetics that would otherwise occur and/or due to ion conductor layer leakage currents that do not allow the EC device to switch across the entire viewable area of larger IGUs (e.g. about a meter wide or more where bus bars would otherwise be configured outside the viewable area at the edges of this width) without such bus bars in the viewable area to provide the extra voltage needed to compensate for the leakage current. Certain embodiments described herein, e.g. where cuts are made through one of the TCOs but not the EC device stack itself, do not require bus bars in the viewable area because they include EC devices with very low leakage current. Examples of such devices are described in U.S. patent application Ser. No. 12/814,279, filed Jun. 11, 2010, which is herein incorporated by reference in its entirety. For example, the embodiments described where the resistive zone includes a cut through one of the TCOs include examples where there are no bus bars in the viewable area of the EC device.

Figure 5I:
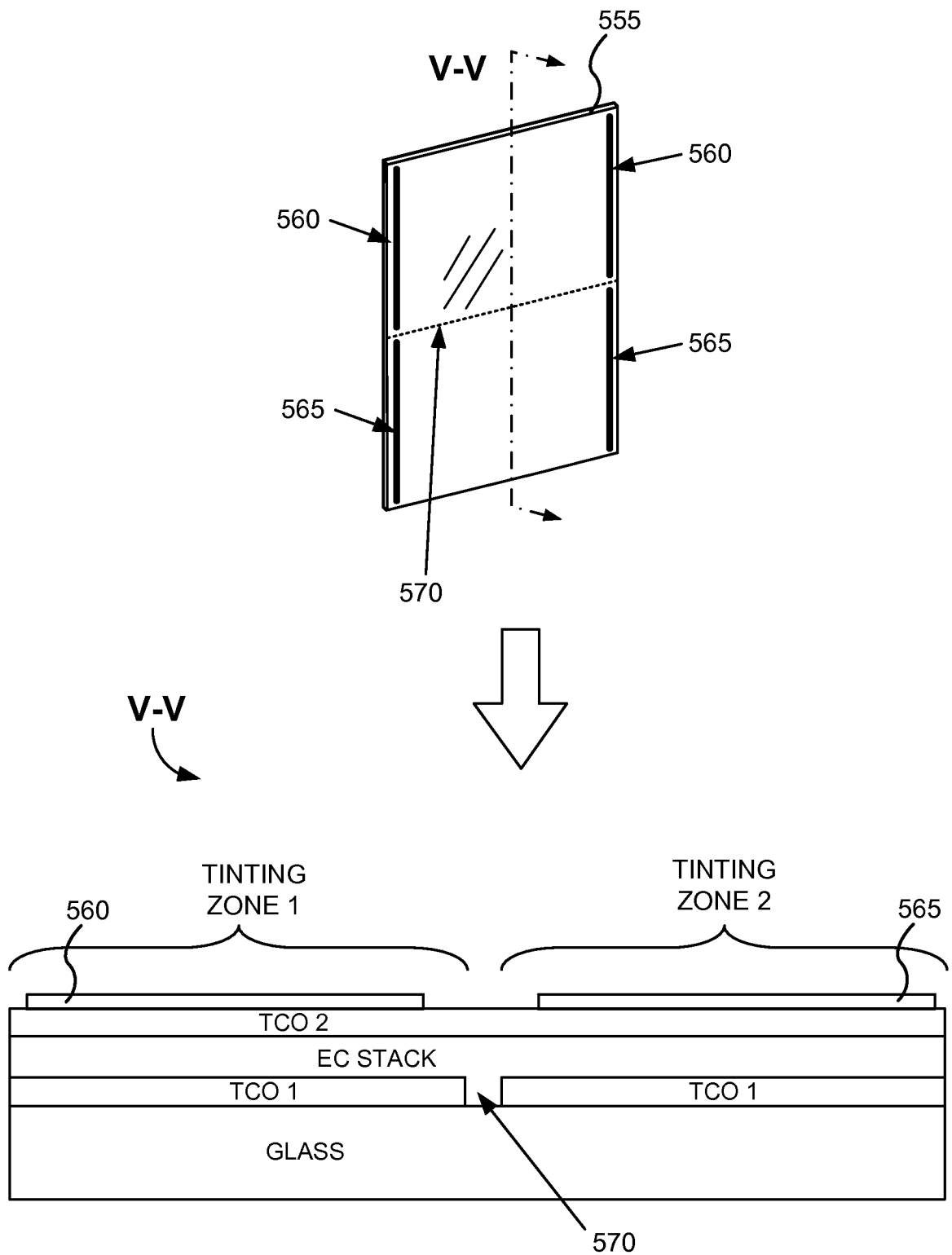

FIG. 5I depicts an EC lite, 555, configured with a resistive zone, 570, created by inhibiting the electrical conductivity across one of the transparent conducting oxides, in this example a cut is made through the TCO nearer the substrate. The EC lite is much like the one described in relation to FIG. 5C, but in this embodiment one of the TCOs is cut through along the resistive zone (cut 570), while the other TCO is left intact. The EC device stack is unchanged in the resistive zone area, only the bottom TCO is cut. The EC lite 555 has two sets of bus bars, 560 and 565. Bus bar set 560 powers both the upper and the lower TCOs in tint zone 1 (TCO 1 and TCO 2), while bus bar set 565 powers tint zone 2. The lower portion of FIG. 5I shows cross section V-V (only the bus bars on TCO 2 are depicted). The EC device will still at least partially color along the resistive zone by virtue of one of the TCOs being fully intact, monolithic, along with the EC stack. While there is a narrow region of the opposite TCO 1 missing, there is sufficient voltage potential established between the intact TCO 2 and the edge of the cut (opposing) TCO 1 along the resistive zone to allow coloration of the EC device in the resistive zone, albeit more slowly than if both TCOs were intact along the resistive zone. The resistive zone may color more lightly when only one of the tinting zones is powered, while with both tinting zones powered, the resistive zone may fully tint or approximate full tint. Each portion of TCO 1 can be powered independently of TCO 2. In this way, separate zones, tinting zone 1 and tinting zone 2, may, e.g., be tinted more effectively. Since there is a cut through the TCO 1, if only one zone is powered, a tinting level $V_{TCL}$ is only established in that tinting zone. The cut in TCO 1 aids in establishing and maintaining a uniform tinting front. In this example, since the TCOs are a type of moisture barrier, EC lite 555 may be incorporated into an IGU where the EC device is hermetically sealed within the volume of the IGU, and a top coat may not be necessary because TCO 2 remains intact, although in one embodiment a top coat is applied to TCO 2. Because the bus bars in EC lite 555 are orthogonal to the resistive zone 570, the tinting front is also orthogonal to the bus bars.

Figure 5J:
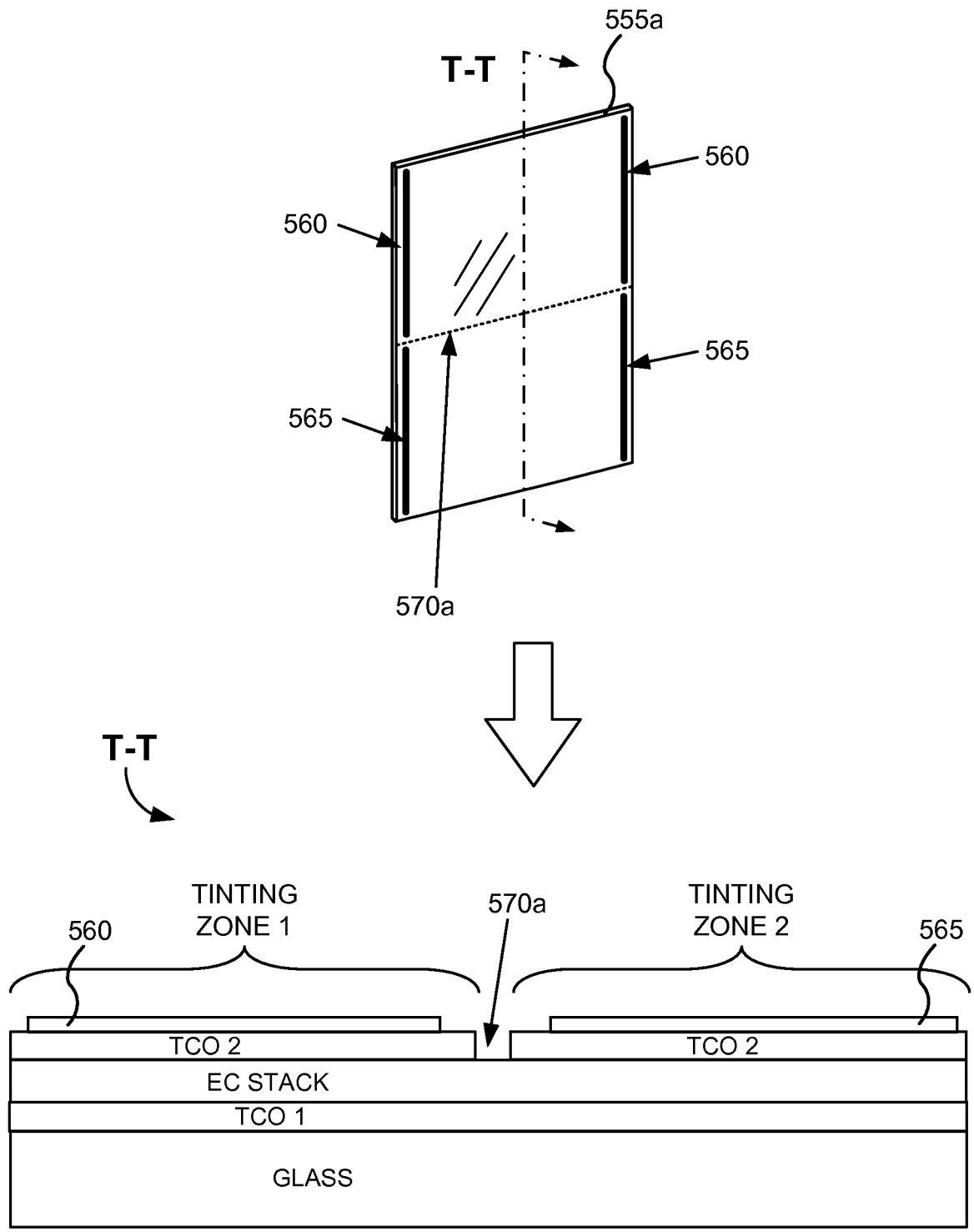

FIG. 5J depicts an EC lite, 555*a*, configured with a resistive zone, 570*a*, created by inhibiting the electrical conductivity across one of the transparent conducting oxides, in this example a cut is made through the TCO distal the substrate. The EC lite is much like the one described in relation to FIG. 5I, but in this embodiment TCO 2 is cut through while TCO 1 is left intact. The EC device stack is unchanged in the resistive zone area, only the top TCO is cut. The EC lite 555*a* has two sets of bus bars, 560 and 565. Bus bar set 560 powers both the upper and the lower TCOs in tint zone 1 (TCO 1 and TCO 2), while bus bar set 565 powers tint zone 2. The lower portion of FIG. 5J shows cross section T-T (only the bus bars on TCO 2 are depicted). The EC device will still at least partially color along the resistive zone by virtue of one of the TCOs being fully intact, monolithic, along with the EC stack. While there is a narrow region of the opposite TCO 2 missing, there is sufficient voltage potential established between the intact TCO 1 and the edge of the cut (opposing) TCO 2 along the resistive zone to allow coloration of the EC device in the resistive zone, albeit more slowly than if both TCOs were intact along the resistive zone. The resistive zone may color more lightly when only one of the tinting zones is powered, while with both tinting zones powered, the resistive zone may fully tint or approximate full tinting. Each portion of TCO 2 can be powered independently of TCO 1. In this way, separate zones, tinting zone 1 and tinting zone 2, may, e.g., be tinted more effectively. Since there is a cut through the TCO 2, if only one zone is powered, a tinting level of $V_{TCL}$ is only established in that tinting zone. The cut in TCO 2 aids in establishing and maintaining a uniform tinting front. In this example, since the TCOs are a type of moisture barrier, EC lite 555*a* may be incorporated into an IGU where the EC device is hermetically sealed within the volume of the IGU, and a top coat may be necessary because TCO 2 is cut through, in one embodiment a top coat is applied to TCO 2. Because the bus bars in EC lite 555*a* are orthogonal to the resistive zone 570*a*, the tinting front is also orthogonal to the bus bars.

When two bus bars ends of opposite polarity are located proximate each other on an intact TCO, hot spots can result. Hot spots are described in U.S. patent application Ser. No. 13/452,032, filed Apr. 20, 2012 which is incorporated by reference herein in its entirety. When using TCOs that are cut through, e.g. as depicted in FIG. 5J, hot spots may be avoided because the proximate bus bars of a TCO layer cannot electrically communicate with each other through the TCO. However, to avoid stress on the underlying EC device in the area along the resistive zone formed by cutting through TCO, the ends of the bus bars may be configured so they are not directly over (aligned with) the cut made for the resistive zone.

Figure 5K:
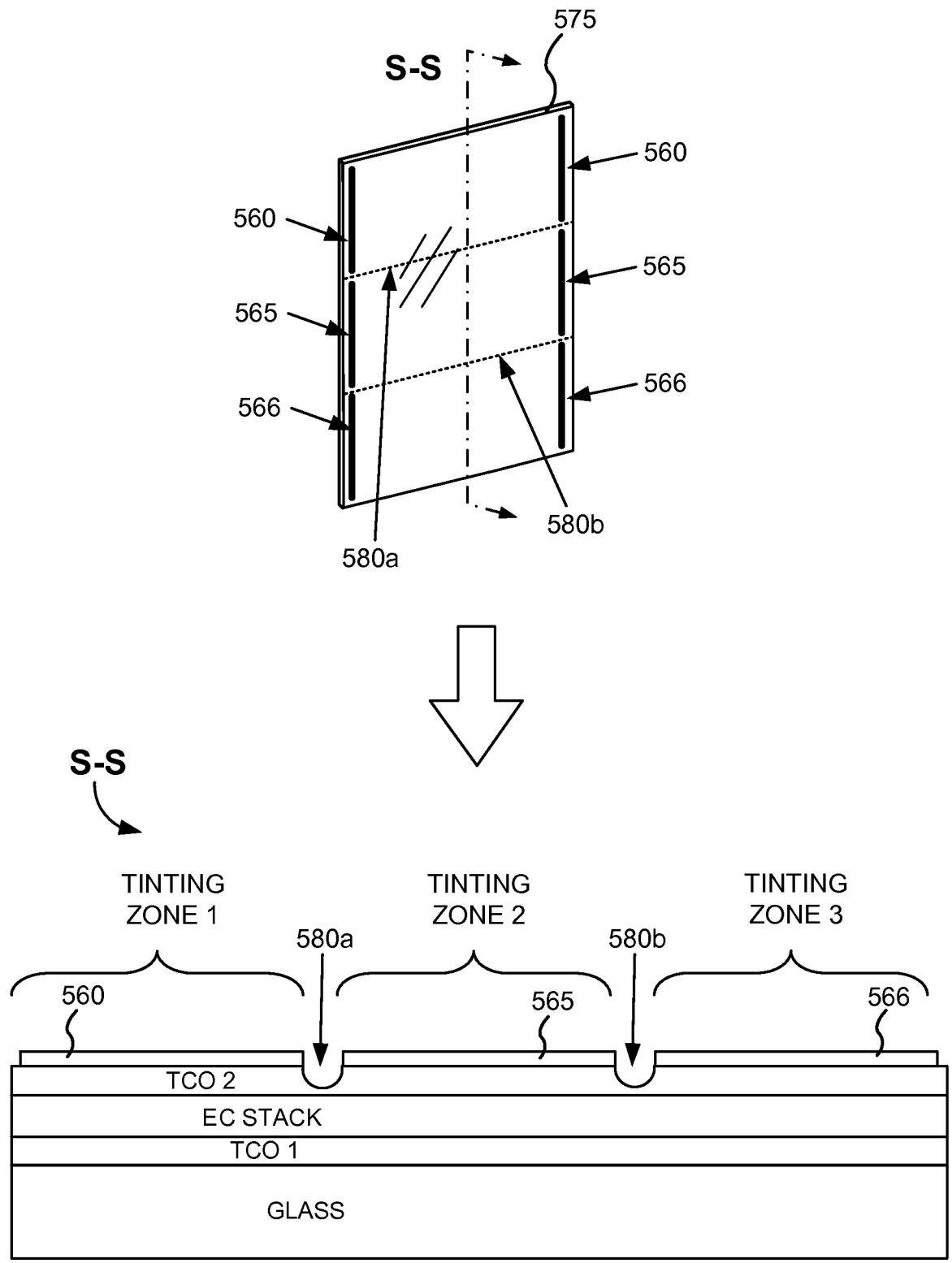

One embodiment is an EC lite as described herein, where a resistive zone is formed by partially cutting through one or both of the TCOs. For example, in one embodiment, e.g. analogous the embodiment described in relation to FIG. 5J, the top TCO is only cut part way through, rather than cut through. In this way a resistive zone is established and the hermiticity of the EC device, imparted by the top TCO is left at least partially intact. FIG. 5K depicts another example.

FIG. 5K depicts an EC lite, 575, configured with two resistive zones, 580a and 580b, created by inhibiting the electrical conductivity across one of the transparent conducting oxides. In this example, partial cuts are made through the TCO distal the substrate (TCO 2). The EC lite is much like the one described in relation to FIG. 5J, but in this embodiment TCO 2 is not cut through, but only some TCO material is removed to form resistive zones 580a and 580b. For example, laser ablation is used to remove material only down to a fraction of the depth of the ITO. In one embodiment, between about 10% and about 90% of the TCO material is removed along the zone, in another embodiment between about 25% and about 75% of the TCO material is removed, in yet another embodiment between about 40% and about 60% of the material is removed. By removing only part of the TCO material, a resistive zone is fabricated while not exposing the EC stack to the ambient. Lite 575 has three tint zones, by virtue of having two resistive zones. The EC lite 575 has three sets of bus bars, 560, 565 and 566. Bus bar set 560 powers both the upper and the lower TCOs in tint zone 1 (TCO 1 and TCO 2), bus bar set 565 powers tint zone 2, and bus bar set 566 powers tint zone 3. Each tint zone can be independently controlled via powering the bottom TCO, and independently charging the TCO 2 bus bars, depending upon which zone tinting is desired. Because the resistive zones have a higher sheet resistance relative to the bulk TCO, charge loss over this barrier is slow and allows the powered zone to fully tint while the tinting front approximates the position of the resistive zone.

The lower portion of FIG. 5K shows cross section S-S (only the bus bars on TCO 2 are depicted). The EC device will still at least partially color along the resistive zone by virtue of TCO 2 being fully intact, monolithic, along with the EC stack. The resistive zone may color more lightly when only one of the tinting zones is powered, or not at all, depending on its width and the thickness of the TCO in the resistive zone. With adjacent tinting zones powered, the resistive zone may fully tint or approximate full tinting. In this example, since the TCOs are a type of moisture barrier, EC lite 575 may be incorporated into an IGU where the EC device is hermetically sealed within the volume of the IGU, and a top coat may be necessary because TCO 2 is at least partially cut through, in one embodiment a top coat is applied to TCO 2. Because the bus bars in EC lite 575 are orthogonal to the resistive zones 580a and 580b, the tinting front is also orthogonal to the bus bars and approximates the line defined by the resistive zones.

Note, in FIG. 5K, the bus bars ends are substantially coextant with the resistive zones. In one embodiment, bus bar material is applied and then the resistive zones are formed by cutting through the bus bar material and at least some of the top TCO. In certain embodiments the top TCO is cut through, while not cutting the EC device stack through (a portion of the EC stack may be cut, but sometimes not through the IC material so as not to form electrical shorts along the resistive zone). By applying, e.g., only two lines of bus bar material (e.g. silver based ink) and firing the bus bars, the resistive zones and individual bus bar pairs can be fabricated in the same process by cutting through the bus bar material and into or through the top TCO simultaneously. This saves process steps. The bus bar on the bottom TCO 1 is cut through without cutting through the bottom TCO. In one embodiment the bus bars on the top TCO are formed by cutting through along with the top TCO, either fully or partially cut, while the bottom bus bars are applied separately to each tinting zone. In certain embodiments, each tinting zone's bus bars are applied individually to each tinting zone. The latter may be done to avoid the aforementioned hot spots, e.g. when cutting through the bus bar and TCO in the same process, the ends of the newly formed bus bars are necessarily aligned with the cut in the TCO, since they were from the same cutting process.

Resistive Layer Through EC Stack Changes to Speed/Coloration Efficiency

In certain embodiments, a resistive zone can be created by changing the electrochromic behavior of one or more layers of the EC stack vs. applied voltage. In this case, the resistive zone provides a resistance to coloration rather than electrical resistance per se. For example, the resistive zone may color slowly or less deeply (higher Tvis) compared to the rest of the device at same $V_{eff}$. This can be achieved by, for example, 1) reducing the dose of ions (typically $Li^+$) causing the electrochromic reaction, 2) changing the properties of the electrochromic layers (EC, CE) such that the optical change per ion is reduced (i.e. reduced coloration efficiency), 3) reducing ion mobility in the EC and/or CE layers in the resistive zone, and/or 4) increasing the thickness of the IC layer and/or reducing ion mobility in the IC layer such that it is harder for the ions to move across the IC layer. Any of these changes can be done during deposition and/or post fabrication. For example, local heating of the EC stack due thermal/laser irradiation can be used, or for example, selectively altering deposition rate and/or oxidation state in the resistive zone relative to the bulk device.

Certain embodiments concern methods of fabricating apparatus and devices described herein. One embodiment is a method of forming an EC lite having two or more tinting zones, the method including a) forming a EC device (e.g., a monolithic EC device), b) applying a single bus bar to the top TCO of the monolithic EC device, and c) cutting through the bus bar and at least part way through the top TCO thereby fabricating said two or more tinting zones each having separate bus bars on the top TCO by virtue of c.

Resistive zones need not be linear as depicted, but rather may be of any shape. For example, for desired effects, one might choose a resistive zone that is zigzagged, curved or irregularly shaped along adjacent tinting zones.

Figure 6A:
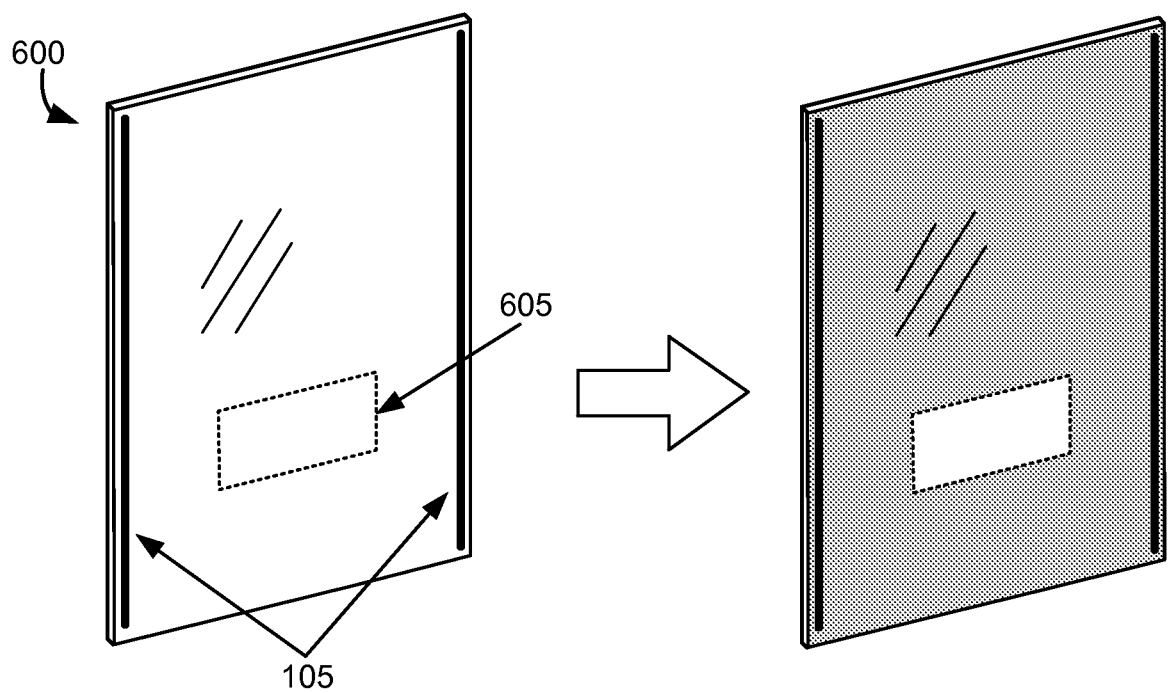
FIG. 6A depicts a resistive zone establishing a closed perimeter defining a separate tinting zone.
Figure 6B:
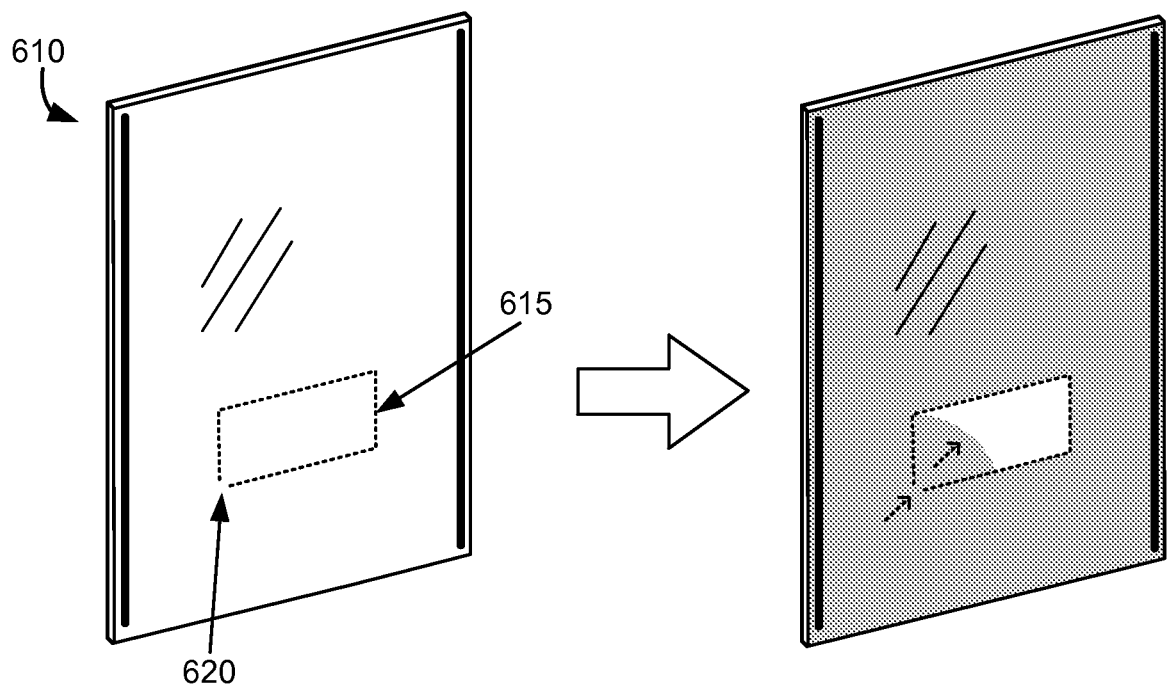
FIG. 6B depicts a resistive zone establishing an open perimeter defining a separate tinting zone.

In certain embodiments, resistive zones are used to define a perimeter, closed or open, of a region of an EC window, that is, a sub-portion (area) of a monolithic EC device. For example, these resistive zones can be used to highlight particular symbols or shapes in the viewable region of the EC window. One embodiment with such a resistive zone is illustrated in FIGS. 6A and 6B. For example, an end user may wish to have an area of the EC window that does not tint, or that becomes tinted more slowly, than the remainder of the tintable EC window.

FIG. 6A depicts an EC lite, 600, which includes a single pair of bus bars, 105, as well as a resistive zone, 605. In this example, the resistive zone is in the shape of a closed rectangle (as indicated by the dotted line). Resistive zone 605 may not be visually discernible to the naked eye. In one embodiment, resistive zone 605 is configured such that the portions of the TCOs of the EC device in the resistive zone (as indicated by the dotted line) have a higher electrical resistance than the portions of the TCOs in the remainder of the EC device on either side of the resistive zone (in this example both outside and inside the rectangular perimeter zone), but the resistive zone still passes charge. In this embodiment, when the EC device is tinted, the area around the resistive zone 605 tints first, the tinting front slowing when it reaches the rectangular closed resistive zone 605. This momentarily, e.g. for a period of minutes, gives the effect of a small untinted view port in a larger tinted window. As the charge bleeds beyond the resistive zone and into the untinted rectangular region within the zone, this gives the effect of the small untinted view port closing as it tints. In another embodiment, resistive zone 605 is configured such that the portions of the TCOs of the EC device in the resistive zone (as indicated by the dotted line) have a very high resistance to electrical charge as compared to the portions of the TCOs in the remainder of the EC device on either side of the resistive zone (in this example both outside and inside the rectangular perimeter zone), that is, the resistive zone effectively blocks electrical charge. In this embodiment, when the area outside the zone is tinted, the area inside the zone may never tint because the charge may not be able to pass the resistive barrier 605. This gives the effect of a small untinted view port in a larger tinted window, so long as the EC device is tinted. In another embodiment, resistive zone 605 is configured such that the portions of the TCOs of the EC device in the resistive zone (as indicated by the dotted line) and in the region within the resistive zone have a very high resistance to electrical charge as compared to the portions of the TCOs in the remainder of the EC device on the outside of the resistive zone.

FIG. 6B shows a similar EC lite, 610, having a resistive zone, 615, which is "open" by virtue of a gap, 620, in the perimeter. In this example, the resistive zone 615 is configured to block electrical charge. When the EC device is tinted, the area around the resistive zone 615 tints first, the tinting front slowing when it reaches the rectangular closed resistive zone 615, except at the open portion 620, where the tinting front gives the effect of "pouring in" or "filling in" (as indicated by the two dotted arrows) the rectangular region within resistive zone 615. Eventually, when the area inside resistive zone 615 is tinted, resistive zone 615 may no longer be discernible to the naked eye, as the EC device colors under the zone, as described above. Configuring resistive zones in such a way can be used to achieve permanent or transient tinting effects on EC windows, e.g., to display a logo or words in a transient manner for presentation during marketing purposes, or to achieve tinted and non-tinting zones on an EC lite. EC lites so configured can be incorporated into IGUs as describe and/or laminated with mate lites.

Multi-EC Lite Patterns

Figure 7:
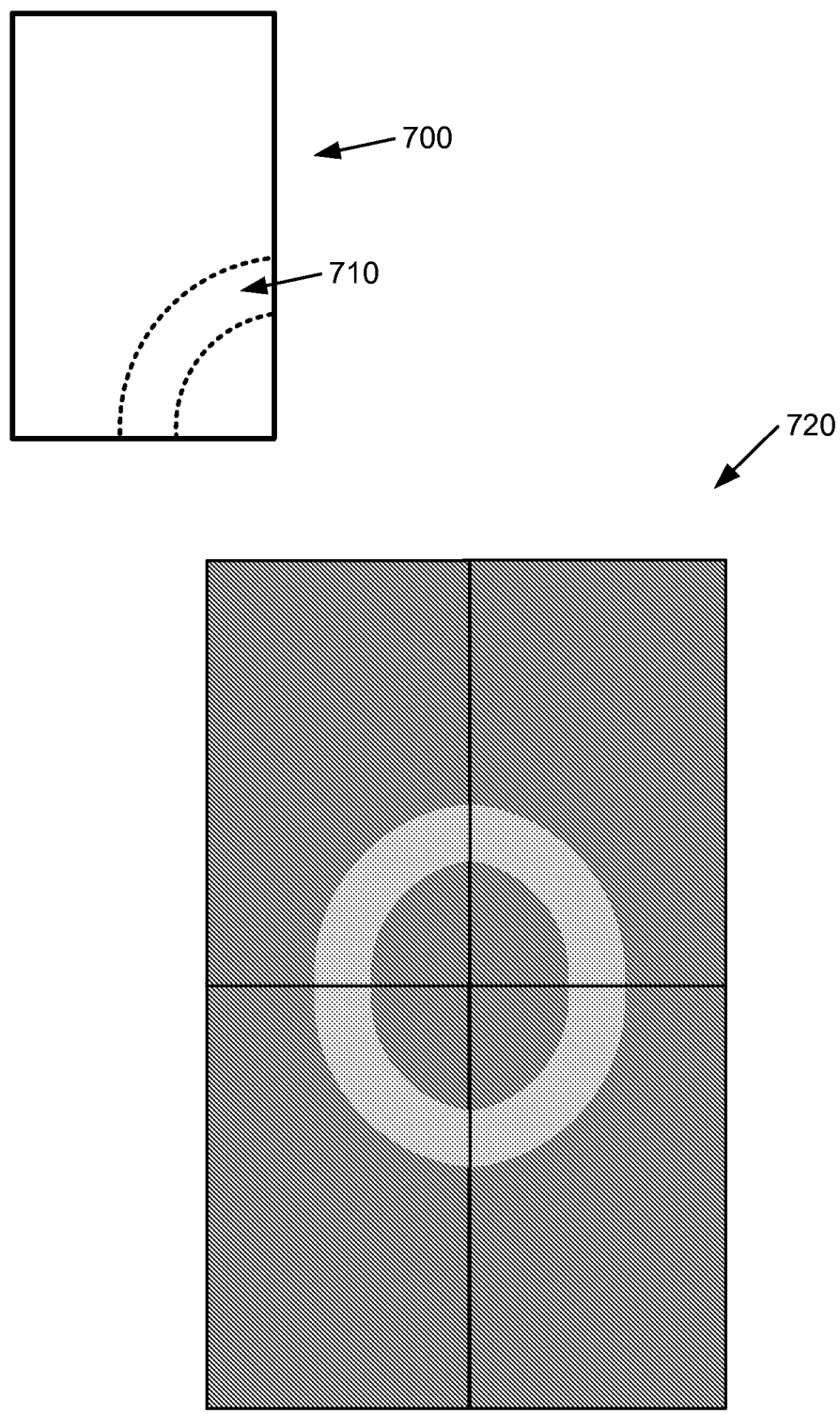
FIG. 7 depicts using resistive zones for multi EC lite patterns/displays.

Embodiments described can also be used to create patterns that encompass more than one IGU, laminate or other construct containing one or more monolithic EC lites. For example, as depicted in FIG. 7, an EC lite, 700, is configured with a resistive zone or zones, such that a portion, 710, of the EC lite does not color, or colors less intensely than the bulk device (the dotted lines are only to depict where the portion 710 is on the EC lite). Four similarly configured lites 700 are arranged so that when colored, they form a display, such as the letter "O" in this example.

Figure 8:
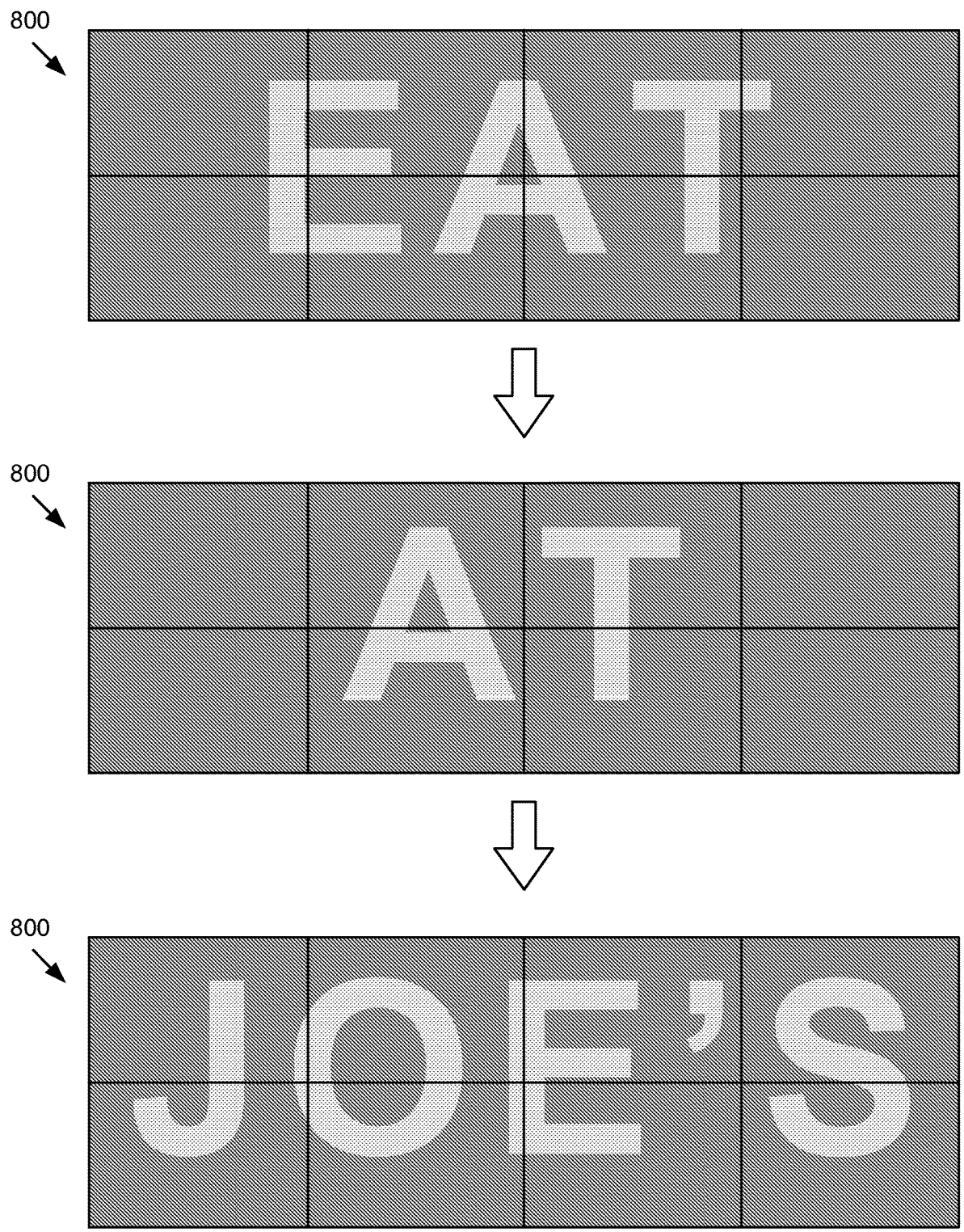
FIG. 8 depicts a building facade using resistive zones to create words and/or ornamental designs.

Many such lites can be configured for display purposes, e.g. on a curtain wall or façade of a building for advertising purposes. Since EC monolithic EC lites can be made quite large, e.g., 6 feet×10 feet, very large words, symbols, ornamental designs and the like can be made for retail facades, schools, military installations, airports and the like. Moreover, since e.g. laminates and/or IGUs can have two or more registered EC lites, and each EC lite of any laminate and/or IGU can have tinting features as described herein, many possibilities for changing words, symbols and/or ornamental designs are possible. For example, as depicted in FIG. 8, a glass façade, 800, has eight 5'×10' triple pane IGUs, each IGU having three EC lites, each EC lite is patterned with resistive zones such that different words can be displayed on the facade. In this example, the letters of the words are approximately 6' high, however any pattern, size or arrangement is possible. In one embodiment, the facade includes a "normal" mode where no words are displayed, rather the glass is tinted uniformly across all eight IGUs. The multi-EC lite pattern can be used for skylights, facades, or any place where such displays are desired, e.g. in large skylights at airports or other buildings, words and/or symbols, changing or not, can be communicated to aircraft.

Figure 9:
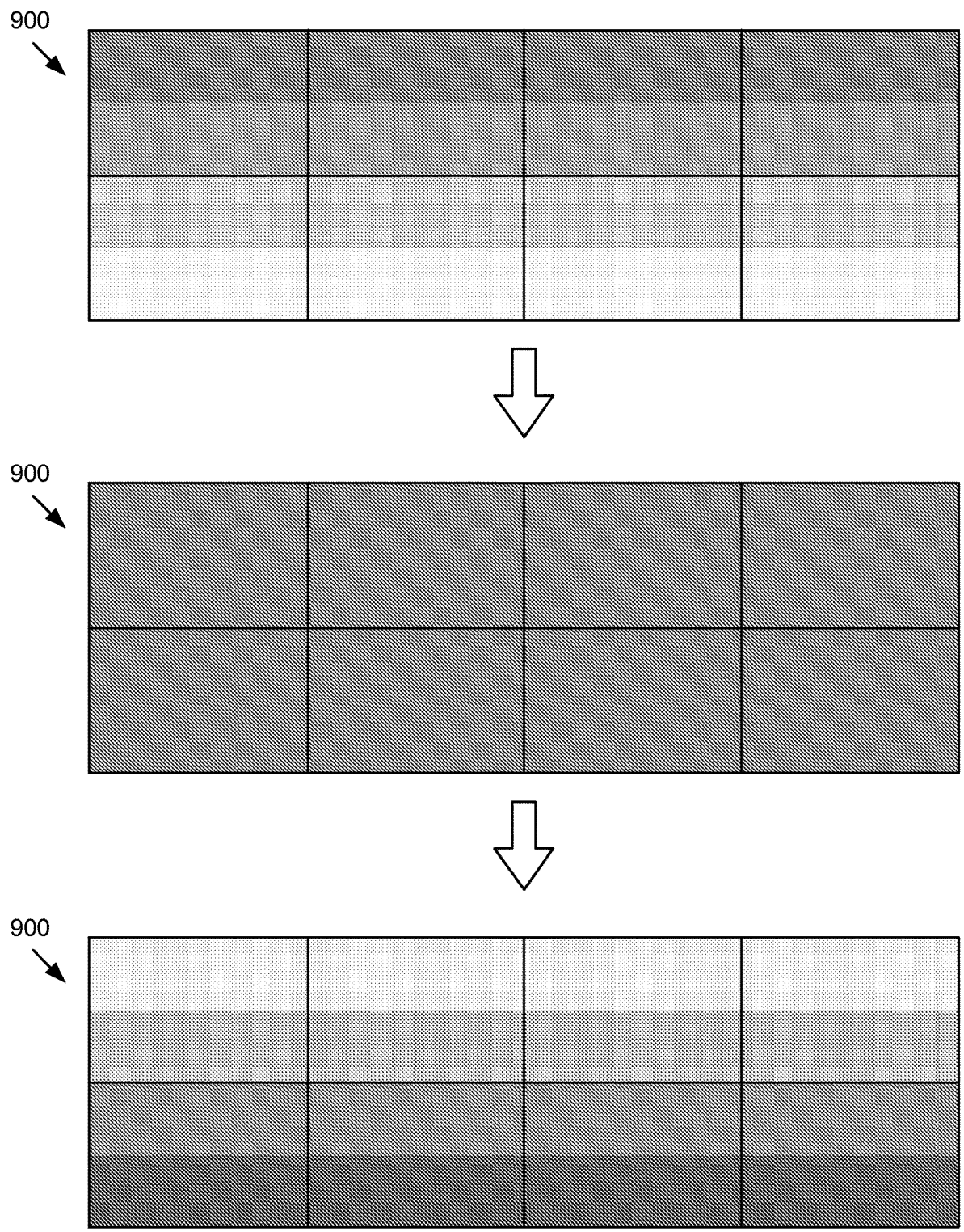
FIG. 9 depicts a building facade using gradient zoning across multiple IGUs.

Gradient zoning can also be done across multiple EC lites, e.g. laminates and/or IGUs, for example as depicted in FIG. 9. FIG. 9 depicts a glass facade, 900, having eight 5'×10' IGUs. In this example, each IGU has a single EC lite, each configured with a monolithic EC device coating and appropriate bus bars and electrical control (e.g. dual feed bus bars as described above) so that each IGU can fully bleach, fully tint, or create gradient coloration across the entire monolithic EC coating. Referring again to FIG. 9, the facade can be made to tint in a gradient from dark to light, from top to bottom, respectively (top façade), tint uniformly across all IGUs (middle façade) or e.g. tint in a gradient from dark to light, from bottom to top, respectively.

One of ordinary skill in the art, armed with this disclosure, would appreciate that tint gradient zones can be used with resistive zones and this combination is within the scope of the embodiments described herein. For example a single EC lite, or a façade, can be made to both tint with gradients and display words, symbols and the like.

Although the foregoing embodiments have been described in some detail to facilitate understanding, the described embodiments are to be considered illustrative and not limiting. It will be apparent to one of ordinary skill in the art that certain changes and modifications can be practiced within the scope of the above description and the appended claims.

We claim:

1. An electrochromic window lite comprising:
   (i) a monolithic electrochromic device on a transparent substrate, the monolithic EC device comprising two transparent conductive oxide (TCO) layers; and
   (ii) two or more tinting zones, each of said two or more tinting zones configured for operation independent of the others; and
   (iii) a resistive zone between each of said two or more tinting zones, the resistive zone being a partial cut through the uppermost TCO layer of the two TCO layers.

2. The electrochromic window lite of claim 1, wherein each of said two or more tinting zones comprises its own associated bus bars located at opposing edges for each of the two or more tinting zones.

3. The electrochromic window lite of claim 1, wherein the electrochromic window lite is incorporated into an insulated glass unit (IGU).

4. The electrochromic window lite of claim 3, wherein the IGU has a mate lite that is not an electrochromic lite.

5. The electrochromic window lite of claim 3, wherein the IGU has a mate lite that is a monolithic electrochromic lite with a single tinting zone.

6. The electrochromic window lite of claim 3, wherein the IGU has a mate lite that is a monolithic electrochromic lite with two or more tinting zones.

7. The electrochromic window lite of claim 6, configured to tint in any one or more tinting zones to <1% T.

8. The electrochromic window lite of claim 1, wherein the resistive zone substantially spans across the width of the monolithic electrochromic device.

9. The electrochromic window lite of claim 1, wherein the resistive zone is between about 1 nm wide and about 10 nm wide.

10. The electrochromic window lite of claim 9, wherein the resistive zone is formed by removing between about 10% and about 90% of the uppermost TCO layer along the resistive zone.

11. The electrochromic window lite of claim 10, wherein the resistive zone is formed by laser irradiation of the uppermost TCO layer.

12. The electrochromic window lite of claim 2, wherein each of said two or more tinting zones associated bus bars are formed by laser irradiation during formation of the resistive zone by cutting through a single bus bar.

13. A method of forming a monolithic electrochromic (EC) device comprising two tinting zones, the method comprising:
 a) forming the monolithic EC device comprising two transparent conductive oxide (TCO) layers;
 b) applying a single bus bar to the uppermost TCO layer of the two TCO layers of the monolithic EC device;
 c) cutting through the single bus bar along its width; and
 d) cutting at least part way through the uppermost TCO layer, but not entirely through the uppermost TCO and not through an electrode material layer adjacent to the uppermost TCO layer, to form a resistive zone between the two tinting zones;
 wherein c) forms separate bus bars for each of the two tinting zones from the single bus bar.

14. The method of claim 13, wherein c) and d) are performed in a single cutting step.

15. The method of claim 13, wherein the resistive zone substantially spans the width of the monolithic EC device.

16. The method of claim 13, wherein the resistive zone is between about 1 nm wide and about 10 nm wide.

17. The method of claim 13, wherein the resistive zone is formed by removing between about 10% and about 90% of the uppermost TCO layer along the resistive zone.

18. The method of claim 17, wherein the resistive zone is formed by laser irradiation of the uppermost TCO layer.

19. An electrochromic window lite comprising:
 a transparent substrate having a viewable area;
 an electrochromic device disposed on the viewable area of the transparent substrate;
 a region of the viewable area that is not covered by the electrochromic device, said region capable of providing a bright spot or bright region when the electrochromic device is tinted; and
 an obscuring material over the region of the viewable area that is not covered by the electrochromic device, wherein the obscuring material has a lower transmittance than the transparent substrate.

20. The electrochromic window lite of claim 19, wherein the region of the viewable area that is not covered by the electrochromic device is a pinhole, a scribe line, or an edge line.

21. A method of obscuring a potentially bright area produced by a region of a viewable area of a transparent substrate that is not covered by an electrochromic device, the method comprising:
 i. providing an electrochromic lite having the electrochromic device disposed on the viewable area of the transparent substrate;
 ii. identifying a site of the region on the viewable area that is not covered by the electrochromic device; and
 iii. applying an obscuring material to the region of the viewable area that is not covered by the electrochromic device;
 wherein the obscuring material has a lower transmittance than the transparent substrate.

22. The method of claim 21, wherein the region of the viewable area that is not covered by the electrochromic device is a pinhole, a scribe line, or an edge line.

* * * * *